US012627107B2

(12) United States Patent
Westerby et al.

(10) Patent No.: US 12,627,107 B2
(45) Date of Patent: May 12, 2026

(54) SYSTEM AND METHODS FOR DETERMINING CRIMP APPLICATIONS AND REPORTING POWER TOOL USAGE

(71) Applicant: MILWAUKEE ELECTRIC TOOL CORPORATION, Brookfield, WI (US)

(72) Inventors: Carl B. Westerby, Menomonee Falls, WI (US); Jonathan E. Abbott, Wilmington, DE (US); Corey J. Dickert, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 323 days.

(21) Appl. No.: 17/885,690

(22) Filed: Aug. 11, 2022

(65) Prior Publication Data

US 2023/0060846 A1 Mar. 2, 2023

Related U.S. Application Data

(60) Provisional application No. 63/231,797, filed on Aug. 11, 2021.

(51) Int. Cl.
*H01R 43/042* (2006.01)
*B21D 39/04* (2006.01)

(52) U.S. Cl.
CPC ....... *H01R 43/0427* (2013.01); *B21D 39/048* (2013.01)

(58) Field of Classification Search
CPC .............. H01R 43/042; H01R 43/0427; H01R 43/0428; H01R 43/0486; B21D 39/048; B25B 27/10; G05B 19/4065
See application file for complete search history.

(56) References Cited

U.S. PATENT DOCUMENTS

| | | | |
|---|---|---|---|
| 1,084,935 | A | 1/1914 | Flora et al. |
| 2,208,058 | A | 7/1940 | Smith |

(Continued)

FOREIGN PATENT DOCUMENTS

| | | | |
|---|---|---|---|
| CN | 2250842 | Y | 4/1997 |
| CN | 118393861 | A | 7/2024 |

(Continued)

OTHER PUBLICATIONS

Meiners et al., "Towards an Inline Quality Monitoring for Crimping Processes Utilizing Machine Learning Techniques," 10th International Electric Drives Production Conference, IEEE, 2020, 6 pages.

(Continued)

*Primary Examiner* — Edward T Tolan
(74) *Attorney, Agent, or Firm* — Quarles & Brady LLP

(57) ABSTRACT

Systems and methods for reporting usage of a power tool. The power tool comprises a pair of jaws configured to crimp a workpiece, a piston cylinder configured to actuate at least one of the pair of jaws, and a sensor configured to sense operating characteristics associated with a crimping application. An electronic processor connected to the sensor. The electronic processor is configured to receive, from the sensor, one or more characteristic signals, determine, based on the one or more characteristic signals, a first operating characteristic of the power tool, and determine, based on the one or more characteristic signals, a second operating characteristic of the power tool. The electronic processor is configured to determine the crimping application of the power tool based on the first operating characteristic and the second operating characteristic and generate a report indicating the crimping application performed by the power tool.

21 Claims, 17 Drawing Sheets

(56) References Cited

U.S. PATENT DOCUMENTS

| | | | |
|---|---|---|---|
| 2,254,613 | A | 9/1941 | Matthysse |
| 2,583,733 | A | 1/1952 | Fischer et al. |
| 2,693,218 | A | 11/1954 | Freedom |
| 2,867,808 | A | 1/1959 | Van Sittert |
| 2,869,407 | A | 1/1959 | Swanson |
| 2,887,916 | A | 5/1959 | Freedom |
| 2,897,703 | A | 8/1959 | Fischer et al. |
| 3,068,485 | A | 12/1962 | Lingle et al. |
| 3,070,143 | A | 12/1962 | Klingler |
| 3,397,657 | A | 8/1968 | Klingler |
| 3,481,373 | A | 12/1969 | Blagojevich |
| RE26,834 | E | 3/1970 | Pawloski |
| 3,571,888 | A | 3/1971 | Filippo |
| 3,653,802 | A | 4/1972 | Weiss |
| 3,666,021 | A | 5/1972 | Whitehouse |
| 3,704,620 | A | 12/1972 | Allen |
| 3,733,699 | A | 5/1973 | Bock |
| 3,747,441 | A | 7/1973 | Amtsberg et al. |
| 3,883,938 | A | 5/1975 | Schmidt et al. |
| 3,972,218 | A | 8/1976 | Pawloski |
| 3,998,132 | A | 12/1976 | Rasigade |
| 4,031,619 | A | 6/1977 | Gregory |
| 4,050,835 | A | 9/1977 | Womack |
| 4,132,107 | A | 1/1979 | Suganuma et al. |
| 4,187,708 | A | 2/1980 | Champoux |
| 4,226,110 | A | 10/1980 | Suganuma |
| 4,316,393 | A | 2/1982 | Philipenko |
| 4,339,942 | A | 7/1982 | Svensson |
| 4,342,216 | A | 8/1982 | Gregory |
| 4,382,331 | A | 5/1983 | Kimura |
| 4,433,569 | A | 2/1984 | Santinelli |
| 4,475,374 | A | 10/1984 | Sakai et al. |
| 4,505,170 | A | 3/1985 | Van Laere |
| 4,515,005 | A | 5/1985 | Klein |
| 4,551,059 | A | 11/1985 | Petoia |
| 4,581,894 | A | 4/1986 | Bush et al. |
| 4,648,245 | A | 3/1987 | Mayer |
| 4,669,741 | A | 6/1987 | Röhm |
| 4,754,668 | A | 7/1988 | Oetiker |
| 4,766,750 | A | 8/1988 | Brinkman |
| 4,784,669 | A | 11/1988 | Maack |
| 4,796,461 | A | 1/1989 | Mead |
| 4,835,409 | A | 5/1989 | Bhagwat et al. |
| 4,851,743 | A | 7/1989 | Schmerda et al. |
| 4,890,474 | A | 1/1990 | Agostini et al. |
| 4,941,790 | A | 7/1990 | Kim |
| 4,942,757 | A | 7/1990 | Pecora |
| 4,947,672 | A | 8/1990 | Pecora et al. |
| 4,955,744 | A | 9/1990 | Barth et al. |
| 4,958,541 | A | 9/1990 | Annis et al. |
| 4,989,438 | A | 2/1991 | Simon |
| 4,998,351 | A | 3/1991 | Hartmeister |
| 5,042,207 | A | 8/1991 | Kirn |
| 5,125,327 | A | 6/1992 | Araki et al. |
| 5,148,698 | A | 9/1992 | Dischler |
| 5,150,644 | A | 9/1992 | Kimura |
| 5,152,162 | A | 10/1992 | Ferraro et al. |
| 5,175,963 | A | 1/1993 | Schäfer et al. |
| 5,195,042 | A | 3/1993 | Ferraro et al. |
| 5,195,354 | A | 3/1993 | Yasui et al. |
| 5,209,153 | A | 5/1993 | Araki et al. |
| 5,233,749 | A | 8/1993 | Saito et al. |
| 5,272,811 | A | 12/1993 | Armand |
| 5,282,378 | A | 2/1994 | Kimura |
| 5,307,664 | A | 5/1994 | Homm |
| 5,377,400 | A | 1/1995 | Homm |
| 5,412,546 | A | 5/1995 | Huang |
| 5,439,332 | A | 8/1995 | Spitznagel |
| 5,457,889 | A | 10/1995 | Kimura |
| 5,474,242 | A | 12/1995 | Rafn |
| 5,477,680 | A | 12/1995 | Heskey et al. |
| 5,487,297 | A | 1/1996 | Ryan et al. |
| 5,531,279 | A | 7/1996 | Biek |
| 5,537,902 | A | 7/1996 | Kimura et al. |
| 5,598,732 | A | 2/1997 | Dischler |
| 5,598,737 | A | 2/1997 | Oide |
| 5,630,277 | A | 5/1997 | Kimura |
| 5,639,191 | A | 6/1997 | Womack |
| 5,647,119 | A | 7/1997 | Bourbeau et al. |
| 5,687,567 | A | 11/1997 | Hansson et al. |
| 5,727,417 | A | 3/1998 | Moffatt et al. |
| 5,730,022 | A | 3/1998 | Hansson et al. |
| 5,799,528 | A | 9/1998 | Camping |
| 5,802,850 | A | 9/1998 | Kimura |
| 5,823,233 | A | 10/1998 | McHenry, Jr. |
| 5,832,771 | A | 11/1998 | Oide |
| 5,836,400 | A | 11/1998 | Tupper et al. |
| 5,875,554 | A | 3/1999 | Vogelsanger |
| 5,875,629 | A | 3/1999 | Kimura |
| 5,934,137 | A | 8/1999 | Tarpill |
| 5,974,926 | A | 11/1999 | Kimura |
| 6,075,341 | A | 6/2000 | White et al. |
| 6,167,766 | B1 | 1/2001 | Dunn et al. |
| 6,220,074 | B1 | 4/2001 | Montminy et al. |
| 6,230,542 | B1 | 5/2001 | Frenken |
| 6,240,626 | B1 | 6/2001 | Nghiem |
| 6,260,427 | B1 | 7/2001 | Jones et al. |
| 6,276,186 | B1 | 8/2001 | Frenken |
| 6,289,770 | B1 | 9/2001 | Collins |
| 6,378,194 | B1 | 4/2002 | Nghiem |
| 6,401,515 | B2 | 6/2002 | Frenken |
| 6,434,998 | B2 | 8/2002 | Amherd |
| 6,446,482 | B1 | 9/2002 | Heskey et al. |
| 6,448,732 | B1 | 9/2002 | Block |
| 6,453,719 | B1 | 9/2002 | Heskey et al. |
| 6,510,719 | B2 | 1/2003 | Goop |
| 6,564,610 | B2 | 5/2003 | Lefavour et al. |
| 6,619,101 | B1 | 9/2003 | Faucher et al. |
| 6,662,620 | B1 | 12/2003 | Baron et al. |
| 6,666,064 | B2 | 12/2003 | LeFavour et al. |
| 6,745,611 | B2 | 6/2004 | Lefavour et al. |
| 6,769,356 | B2 | 8/2004 | Frenken |
| 6,986,274 | B2 | 1/2006 | Lefavour et al. |
| 7,000,448 | B2 | 2/2006 | Hamm et al. |
| 7,111,488 | B2 | 9/2006 | Lefavour et al. |
| 7,155,955 | B2 | 1/2007 | Bowles et al. |
| 7,165,439 | B2 | 1/2007 | Lefavour et al. |
| 7,174,324 | B2 | 2/2007 | Kakuhari et al. |
| 7,188,508 | B2 | 3/2007 | Bowles et al. |
| 7,210,327 | B1 | 5/2007 | Tarpill et al. |
| 7,216,523 | B2 | 5/2007 | Frenken |
| 7,260,975 | B2 | 8/2007 | Hamm et al. |
| 7,340,936 | B2 | 3/2008 | Gregg |
| 7,363,799 | B2 | 4/2008 | Hamm et al. |
| 7,409,846 | B2 | 8/2008 | Frenken |
| 7,421,877 | B2 | 9/2008 | Frenken |
| 7,434,440 | B2 | 10/2008 | Fay |
| 7,533,556 | B2 | 5/2009 | Lefavour et al. |
| 7,568,372 | B1 | 8/2009 | Patton et al. |
| 7,578,159 | B2 | 8/2009 | Bowles et al. |
| 7,581,907 | B2 | 9/2009 | Zhou et al. |
| 7,849,589 | B2 | 12/2010 | Morrow |
| 7,908,963 | B2 | 3/2011 | Frenken |
| 7,963,140 | B2 | 6/2011 | Bentoski et al. |
| 8,056,473 | B2 | 11/2011 | Frenken |
| 8,276,430 | B2 | 10/2012 | Barezzani et al. |
| 8,307,690 | B2 | 11/2012 | Cobzaru |
| 8,336,362 | B2 | 12/2012 | Frenken |
| 8,342,001 | B2 | 1/2013 | Zhang |
| 8,418,520 | B2 | 4/2013 | Stucki et al. |
| 8,434,219 | B2 | 5/2013 | Dierks et al. |
| 9,180,583 | B2 | 11/2015 | Frenken |
| 10,646,987 | B2 * | 5/2020 | Barezzani ............. B25B 27/026 |
| 11,366,457 | B1 | 6/2022 | George et al. |
| 2002/0079441 | A1 | 6/2002 | Fries et al. |
| 2003/0037423 | A1 | 2/2003 | Siegel |
| 2003/0066324 | A1 | 4/2003 | Goop |
| 2005/0005672 | A1 | 1/2005 | Sneath |
| 2005/0167130 | A1 | 8/2005 | Setter et al. |
| 2005/0276658 | A1 | 12/2005 | Silva |
| 2006/0289183 | A1 | 12/2006 | Schreiber |
| 2008/0021590 | A1 | 1/2008 | Vanko et al. |
| 2008/0087144 | A1 | 4/2008 | Rollins et al. |

(56) References Cited

U.S. PATENT DOCUMENTS

2008/0276678 A1* 11/2008 Pacaud ................. B25B 27/146
72/21.4
2010/0114358 A1 5/2010 Krapf et al.
2010/0307010 A1 12/2010 Patton et al.
2011/0247506 A1 10/2011 Frenken
2011/0315940 A1 12/2011 Zhong et al.
2012/0160065 A1 6/2012 Frenken
2012/0284981 A1 11/2012 Bungter et al.
2013/0187587 A1 7/2013 Knight et al.
2013/0206022 A1 8/2013 Bungter
2013/0327552 A1 12/2013 Lovelass et al.
2014/0338939 A1 11/2014 Shi
2014/0367134 A1 12/2014 Phillips et al.
2015/0101835 A1 4/2015 Nitsche et al.
2015/0178620 A1 6/2015 Ascari et al.
2016/0000025 A1 1/2016 Hamann et al.
2016/0016222 A1 1/2016 Bungter et al.
2016/0023419 A1 1/2016 Frenken
2016/0342142 A1 11/2016 Boeck et al.
2016/0361069 A1 12/2016 Ardel et al.
2016/0375570 A1 12/2016 Boeck et al.
2017/0057040 A1* 3/2017 Rzasa ................ B23Q 17/2409
2017/0090430 A1 3/2017 Nakazawa
2018/0019561 A1* 1/2018 Montminy ............. B21D 37/14
2018/0161969 A1* 6/2018 Rosani .................. B25B 27/146
2018/0328797 A1 11/2018 Gwon et al.
2019/0061135 A1 2/2019 Cerfeuillet
2019/0187659 A1 6/2019 Li et al.
2019/0217357 A1 7/2019 Ruch et al.
2019/0227528 A1 7/2019 Abbott et al.
2020/0127429 A1 4/2020 Ruch et al.
2020/0156210 A1 5/2020 Sullivan et al.
2020/0160152 A1 5/2020 Buttner et al.
2020/0238487 A1 7/2020 Kanack et al.
2020/0267903 A1 8/2020 Gao et al.
2020/0276680 A1 9/2020 Green et al.
2020/0326718 A1 10/2020 Kandemir et al.
2020/0338677 A1 10/2020 Ozeki
2020/0384618 A1 12/2020 Tanji et al.
2021/0016894 A1 1/2021 Childress
2021/0053212 A1 2/2021 Haetty
2021/0101263 A1 4/2021 Hwang et al.
2021/0101304 A1 4/2021 Green et al.
2021/0104006 A1 4/2021 Green
2021/0116894 A1 4/2021 Wichern et al.
2021/0157297 A1 5/2021 Kaiser et al.
2021/0166154 A1 6/2021 Ogino
2021/0192386 A1 6/2021 Cabrita et al.
2021/0205976 A1 7/2021 Matei
2021/0240145 A1 8/2021 Abbott
2021/0302921 A1 9/2021 Kolter et al.
2021/0312262 A1 10/2021 Postel
2021/0326663 A1 10/2021 Winston et al.
2021/0374549 A1 12/2021 Willmott et al.
2021/0383234 A1 12/2021 Bai et al.
2021/0393337 A1 12/2021 Zucker
2021/0394344 A1 12/2021 Mueckl et al.
2021/0397155 A1* 12/2021 White ................ G05B 19/4065
2022/0019900 A1 1/2022 Wong et al.
2022/0050023 A1 2/2022 Lavazais et al.
2022/0067913 A1 3/2022 Lutz et al.
2022/0092466 A1 3/2022 Carbrita et al.
2022/0100850 A1 3/2022 Sun et al.
2022/0101116 A1 3/2022 Sheikholeslami et al.
2022/0101143 A1 3/2022 Rice et al.
2022/0108132 A1 4/2022 Zhang et al.
2022/0111496 A1 4/2022 Beacham, Jr. et al.
2022/0118595 A1 4/2022 Abbott et al.
2022/0121177 A1 4/2022 Kerwin
2022/0138510 A1 5/2022 Dai et al.
2022/0138511 A1 5/2022 Xu et al.
2022/0172061 A1 6/2022 Willmott et al.
2022/0197227 A1 6/2022 Woehlke et al.
2022/0261618 A1 8/2022 Garcia et al.
2022/0266429 A1 8/2022 Erbele et al.
2022/0292349 A1 9/2022 Stoll et al.
2022/0299946 A1 9/2022 Abbott et al.
2022/0313374 A1 10/2022 Jacobsen et al.
2022/0318616 A1 10/2022 Kamble et al.
2022/0347811 A1 11/2022 Abbott et al.
2022/0405648 A1 12/2022 Lin et al.
2022/0407274 A1 12/2022 Radtke et al.
2022/0410360 A1 12/2022 Erbele et al.
2023/0039379 A1 2/2023 Schmidt
2023/0057100 A1 2/2023 Schirmer et al.
2023/0100132 A1 3/2023 Rice et al.
2023/0100765 A1 3/2023 Roderick et al.
2023/0101812 A1 3/2023 Feng et al.
2023/0102866 A1 3/2023 Bai et al.
2023/0107463 A1 4/2023 Baharloui et al.
2023/0107917 A1 4/2023 Pabbaraju et al.
2023/0115313 A1 4/2023 Weber et al.
2023/0115521 A1 4/2023 Kupcsik et al.
2023/0141816 A1 5/2023 Butzerin et al.
2023/0219204 A1 7/2023 Dieter et al.
2023/0251614 A1 8/2023 Lutz et al.
2023/0298315 A1 9/2023 Sheikholeslami et al.
2023/0316067 A1 10/2023 Rudolph et al.
2023/0321796 A1 10/2023 Speckman et al.
2023/0339142 A1 10/2023 Mayer et al.
2023/0356341 A1 11/2023 Volpert
2023/0367269 A1 11/2023 Glennon et al.
2023/0406344 A1 12/2023 Jiang et al.
2024/0020638 A1 1/2024 Adcock et al.
2024/0037282 A1 2/2024 Rice et al.
2024/0037446 A1 2/2024 Vogt et al.
2024/0051107 A1 2/2024 Petersson et al.
2024/0070451 A1 2/2024 Zhang et al.
2024/0096067 A1 3/2024 Mahmud et al.
2024/0104339 A1 3/2024 Norouzzadeh et al.
2024/0112455 A1 4/2024 He et al.
2024/0139916 A1 5/2024 Baskaran et al.
2024/0149411 A1 5/2024 Schuller et al.
2024/0165774 A1 5/2024 Bajpai
2024/0190032 A1 6/2024 Otto et al.
2024/0198475 A1 6/2024 Bralla et al.
2024/0198506 A1 6/2024 Leray et al.
2024/0217082 A1 7/2024 Abbott et al.
2024/0256961 A1 8/2024 Frischen et al.
2024/0265262 A1 8/2024 Elsken et al.
2024/0326223 A1 10/2024 Hayashi et al.
2024/0333179 A1 10/2024 Abbott et al.
2024/0347286 A1 10/2024 Abbott et al.
2024/0367296 A1 11/2024 Nakamura et al.
2024/0369431 A1 11/2024 Tang et al.
2024/0369432 A1 11/2024 Tang et al.
2024/0370774 A1 11/2024 Aldenfalk et al.
2024/0395260 A1 11/2024 Namata et al.

FOREIGN PATENT DOCUMENTS

CN 118393862 A 7/2024
CN 118393863 A 7/2024
CN 118393864 A 7/2024
CN 118393865 A 7/2024
CN 118393866 A 7/2024
CN 118393867 A 7/2024
CN 118393869 A 7/2024
CN 118393870 A 7/2024
DE 3423283 A1 1/1986
DE 3719442 A1 12/1988
DE 29502032 U1 3/1995
DE 19726314 A1 1/1998
DE 19709017 A1 6/1998
DE 102019131627 A1 5/2021
DE 102020205165 A1 10/2021
DE 102020213080 A1 4/2022
DE 102023200858 A1 8/2024
EP 0860245 A2 8/1998
EP 1122382 A1 8/2001
EP 1398119 A1 3/2004
EP 2501523 B1 4/2015
EP 3623108 A1 3/2020
EP 3716160 A1 9/2020

(56) References Cited

FOREIGN PATENT DOCUMENTS

| | | | |
|---|---|---|---|
| EP | 3770820 | A1 | 1/2021 |
| EP | 3772398 | A1 | 2/2021 |
| EP | 3913547 | A1 | 11/2021 |
| EP | 3950230 | A1 | 2/2022 |
| EP | 4357983 | A1 | 4/2024 |
| FR | 2649348 | A1 | 1/1991 |
| JP | S6326405 | A | 2/1988 |
| JP | H05126263 | A | 5/1993 |
| JP | 2012-200807 | A | 10/2012 |
| JP | 2017529247 | A | 10/2017 |
| JP | 2022-153183 | A | 10/2022 |
| KR | 1020210082184 | A | 7/2021 |
| WO | 9107259 | A1 | 5/1991 |
| WO | 9631319 | A1 | 10/1996 |
| WO | 9831941 | A1 | 7/1998 |
| WO | 2009/138268 | A1 | 11/2009 |
| WO | 2017/162130 | A1 | 9/2017 |
| WO | 2020/073955 | A1 | 4/2020 |
| WO | 2021/042233 | A1 | 3/2021 |
| WO | 2021/060090 | A1 | 4/2021 |
| WO | 2021/241111 | A1 | 12/2021 |
| WO | 2023/000659 | A1 | 1/2023 |
| WO | 2023/076385 | A2 | 5/2023 |
| WO | 2023/076953 | A1 | 5/2023 |
| WO | 2023/076954 | A1 | 5/2023 |
| WO | 2023/076955 | A1 | 5/2023 |
| WO | 2023/110231 | A1 | 6/2023 |
| WO | 2023/180247 | A1 | 9/2023 |
| WO | 2023/186501 | A1 | 10/2023 |
| WO | 2023/217792 | A1 | 11/2023 |
| WO | 2023/222382 | A1 | 11/2023 |
| WO | 2024/044660 | A1 | 2/2024 |
| WO | 2024/099933 | A1 | 5/2024 |
| WO | 2024/140217 | A1 | 7/2024 |
| WO | 2024/156515 | A1 | 8/2024 |

OTHER PUBLICATIONS

International Search Report and Written Opinion for Application No. PCT/US2022/040028 dated Nov. 25, 2022 (10 pages).

Rouesnel et al., "Amazon SageMaker adds Scikit-Learn support," AWS Machine Learning Blog, entry dated Dec. 20, 2018 <https://aws.amazon.com/blogs/machine-learning/amazon-sagemaker-adds-scikit-learn-support/> (7 pages).

* cited by examiner

SYSTEM AND METHODS FOR DETERMINING CRIMP APPLICATIONS AND REPORTING POWER TOOL USAGE

RELATED APPLICATIONS

This application claims the benefit of U.S. Provisional Patent Application No. 63/231,797, filed Aug. 11, 2021, the entire content of which is hereby incorporated by reference.

FIELD

Embodiments described herein relate to power tools.

SUMMARY

Systems described herein include a power tool including a pair of jaws configured to crimp a workpiece, a piston cylinder configured to actuate at least one of the pair of jaws, and one or more sensors configured to provide characteristic signals associated with a crimping application. The power tool includes an electronic processor connected to the one or more sensors. The electronic processor is configured to receive, from the one or more sensors, one or more characteristic signals, determine, based on the one or more characteristic signals, a first operating characteristics of the power tool, and determine, based on the one or more characteristic signals, a second operating characteristic of the power tool. The electronic processor is configured to determine the crimping application of the power tool based on the first operating characteristic and the second operating characteristic, and generate a report indicating the crimping application performed by the power tool.

In some embodiments, both the first operating characteristic and the second operating characteristic are one selected from the group consisting of hydraulic work, contact distance, a maximum time derivative of pressure, an average time derivative of pressure, a minimum time derivative of pressure, a negative time derivative of pressure, a touch off time, a total operating time, an average time derivative of pressure, and an average second time derivative of pressure. In some embodiments, the first operating characteristic is hydraulic work, and the second operating characteristic is contact distance. In some embodiments, the electronic processor uses a random forest machine learning algorithm to determine the crimping application of the power tool. In some embodiments, the report includes the crimping application of the power tool, a time the crimping application was performed, and a location the crimping application was performed.

In some embodiments, the power tool further includes a motor configured to actuate the piston cylinder, the one or more sensors includes a voltage sensor configured to sense a voltage of the motor, and the one or more sensors includes a current sensor configured to sense a current of the motor. In some embodiments, the electronic processor is configured to receive, from the voltage sensor, one or more voltage signals, receive from the current sensor, one or more current signals, determine, based on the one or more voltage signals and the one or more current signals, the first operating characteristic of the power tool, and determine, based on the one or more voltage signals and the one or more current signals, the second operating characteristic of the power tool. In some embodiments, the one or more sensors includes a pressure sensor configured to sense a pressure of the piston cylinder. In some embodiments, the electronic processor is configured to receive, from the pressure sensor, one or more pressure signals, determine, based on the one or more pressure signals, the first operating characteristic of the power tool, and determine, based on the one or more pressure signals, the second operating characteristic of the power tool.

Methods described herein comprise receiving, from one or more sensors, one or more characteristic signals, the one or more characteristic signals being associated with a crimping application, determining, based on the one or more characteristic signals, a first operating characteristic of the power too, and determining, based on the one or more characteristic signals, a second operating characteristic of the power tool. The method includes determining the crimping application of the power tool based on the first operating characteristic and the second operating characteristic, and generating a report indicating the crimping application performed by the power tool.

In some embodiments, both the first operating characteristic and the second operating characteristic are one selected from the group consisting of hydraulic work, contact distance, a maximum time derivative of pressure, an average time derivative of pressure, a minimum time derivative of pressure, a negative time derivative of pressure, a touch off time, a total operating time, an average time derivative of pressure, and an average second time derivative of pressure. In some embodiments, the first operating characteristic is hydraulic work, and the second operating characteristic is contact distance. In some embodiments, the method includes using a random forest machine learning algorithm to determine the crimping application of the power tool. In some embodiments, the report includes the crimping application of the power tool, a time the crimping application was performed, and a location the crimping application was performed.

In some embodiments, the one or more sensors includes a voltage sensor configured to sense a voltage of a motor of the power tool, and the one or more sensors includes a current sensor configured to sense a current of the motor. In some embodiments, the method includes receiving, from the voltage sensor, one or more voltage signals, receiving, from the current sensor, one or more current signals, determining, based on the one or more voltage signals and the one or more current signals, the first operating characteristic of the power tool, and determining, based on the one or more voltage signals and the one or more current signals, the second operating characteristic of the power tool. In some embodiments, the one or more sensors includes a pressure sensor configured to sense a pressure of a piston cylinder of the power tool. In some embodiments, the method includes receiving, from the pressure sensor, one or more pressure signals, determining, based on the one or more pressure signals, the first operating characteristic of the power tool, and determining, based on the one or more pressure signals, the second operating characteristic of the power tool.

Additional systems described herein include a power tool include a piston cylinder configured to be actuated to perform a crimping application, and one or more sensors configured to sense power tool characteristics associated with the crimping application. An electronic processor is connected to the one or more sensors. The electronic processor is configured to receive, from the one or more sensors, one or more characteristic signals, and determine, based on the one or more characteristic signals, a plurality of operating characteristics. The electronic processor is configured to determine the crimping application of the power tool based on the plurality of operating characteristics and generate a report indicating the crimping application performed by the power tool.

In some embodiments, the report includes the crimping application of the power tool, a time the crimping application was performed, and a location the crimping application was performed. In some embodiments, the electronic processor uses a random forest machine learning algorithm to determine the crimping application of the power tool. In some embodiments, the random forest machine learning algorithm is composed of a plurality of algorithms, each algorithm configured to provide an output. In some embodiments, the electronic processor is configured to determine the crimping application by determining which output of the plurality of algorithms occurs the most frequently.

In some embodiments, the power tool includes a motor configured to actuate the piston cylinder, the one or more sensors includes a voltage sensor configured to sense a voltage of the motor, and the one or more sensors includes a current sensor configured to sense a current of the motor. In some embodiments, the electronic processor is configured to receive, from the voltage sensor, one or more voltage signals, receive, from the current sensor, one or more current signals, and determine, based on the one or more voltage signals and the one or more current signals, the plurality of operating characteristics. In some embodiments, the one or more sensors includes a pressure sensor configured to sense a pressure of the piston cylinder. In some embodiments, the electronic processor is configured to receive, from the pressure sensor, one or more pressure signals, and determine, based on the one or more pressure signals, the plurality of operating characteristics.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

DETAILED DESCRIPTION

Figure 1A:
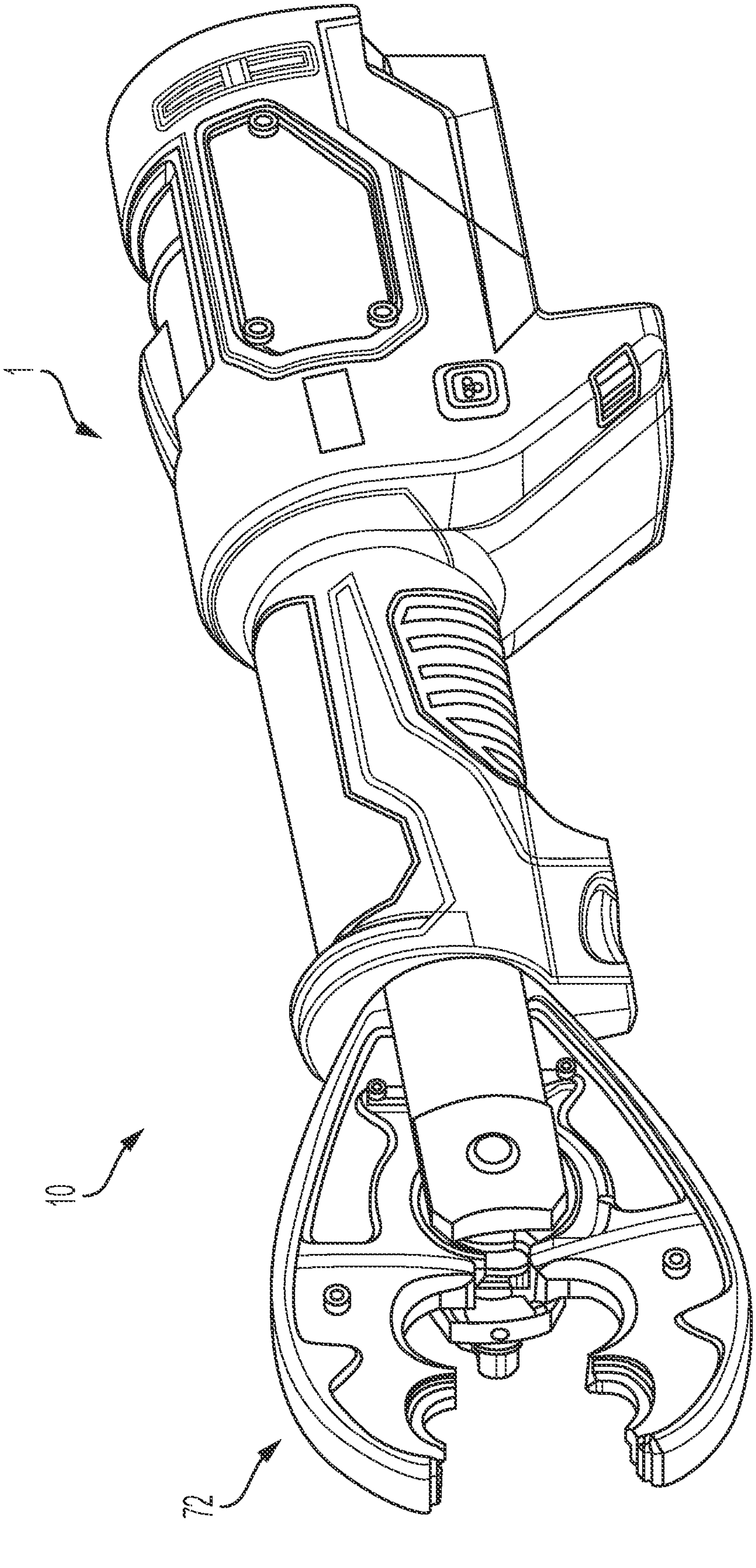
FIGS. 1A-1C are cross-sectional views of a power tool in accordance with an embodiment described herein.
Figure 1B:
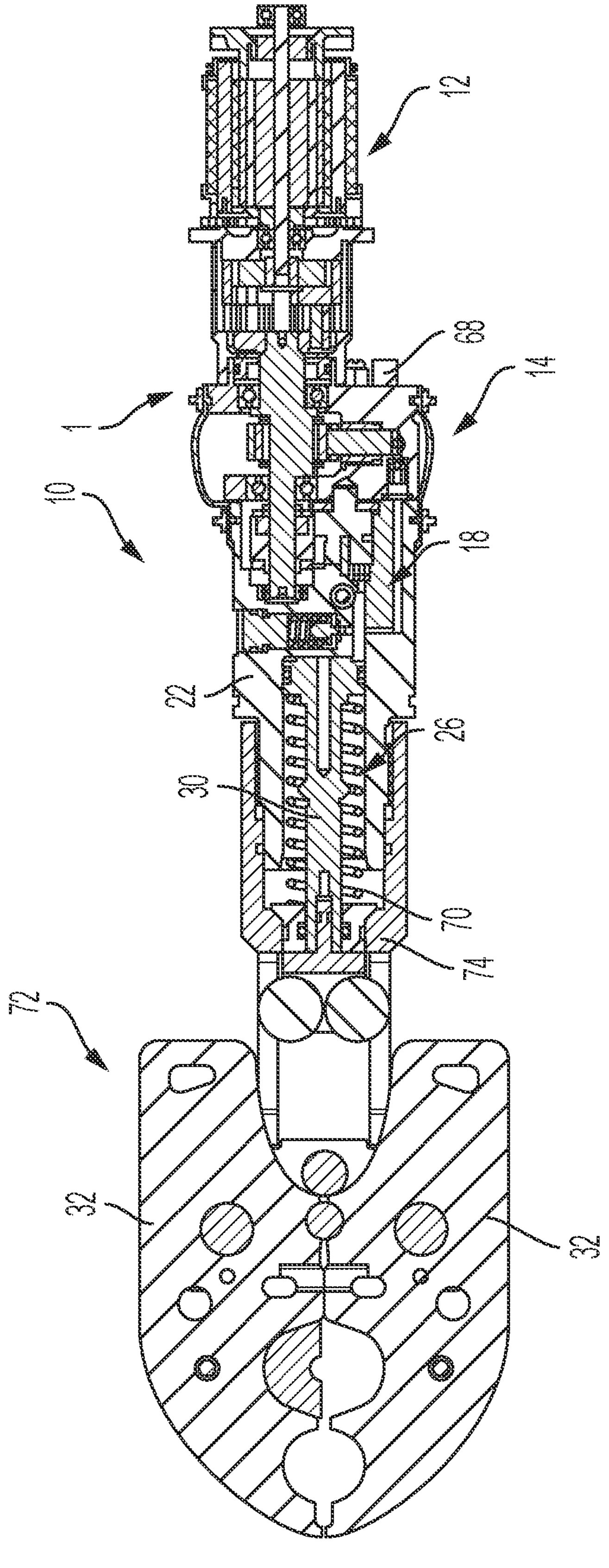
Figure 1C:
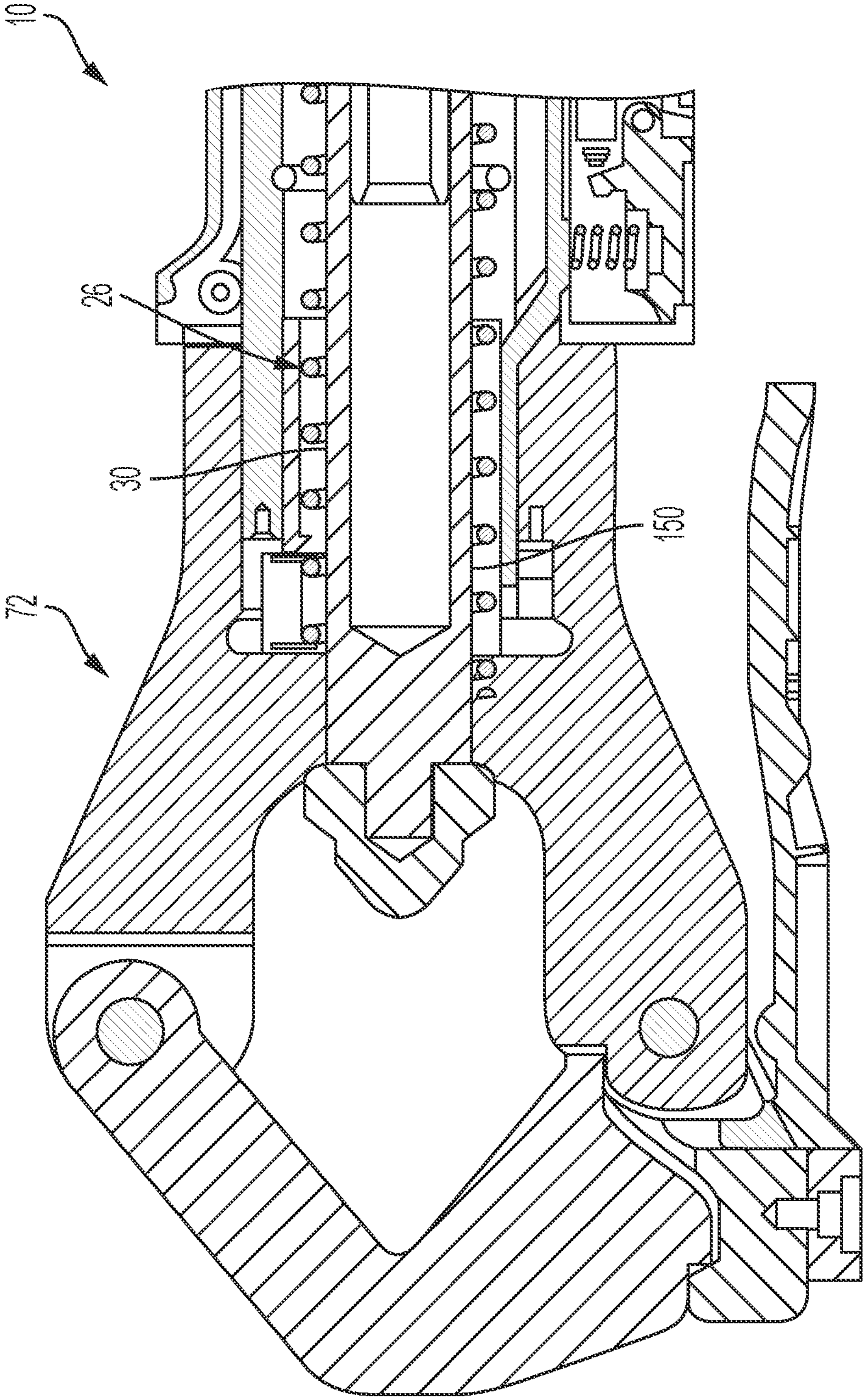

FIG. 1A illustrates an embodiment of a power tool 10, such as a crimper. The power tool 10 includes a crimper head 72 and a body 1 (e.g., a housing). As illustrated in FIGS. 1B-1C, the power tool 10 includes an electric motor 12, and a pump 14 driven by the motor 12. In some embodiments, the power tool 10 also includes a cylinder housing 22 defining a piston cylinder 26, and an extensible piston 30 disposed within the piston cylinder 26. The power tool 10 also includes electronic control and monitoring circuitry for controlling and/or monitoring various functions of the power tool 10. In some embodiments, the pump 14 causes the piston 30 to extend from the cylinder housing 22 and actuate a pair of jaws 32 for crimping a workpiece, such as a connector. The jaws 32 are a part of the crimper head 72, which also includes a clevis 74 for attaching the crimper head 72 to the body 1 of the power tool 10, which otherwise includes the motor 12, pump 14, cylinder housing 22, and piston 30.

The crimper head 72 may include different types of dies depending on the size, shape, and material of the workpiece. The dies are received, for example, by a recess included within the crimper head 72 or the cylinder housing 22. The dies can be used for electrical applications (e.g., wire and couplings) or plumbing applications (e.g., pipe and couplings). The size of the dies depend on the size of a wire, pipe, coupling, etc., to be crimped. In some embodiments, die sizes include #8, #6, #4, #2, #1, 1/0, 2/0, 3/0, 4/0, 250

MCM, 300 MCM, 350 MCM, 400 MCM, 500 MCM, 600 MCM, 750 MCM, and 1000 MCM. The shape formed by the die can be circular or another shape. In some embodiments, the dies are configured to crimp various malleable materials and metals, such as copper (Cu) and aluminum (Al). Additionally, the dies can be removable to allow the power tool 10 to crimp different workpieces. In some embodiments, the power tool 10 may be a dieless crimper (see, e.g., FIG. 1C).

Figure 2:
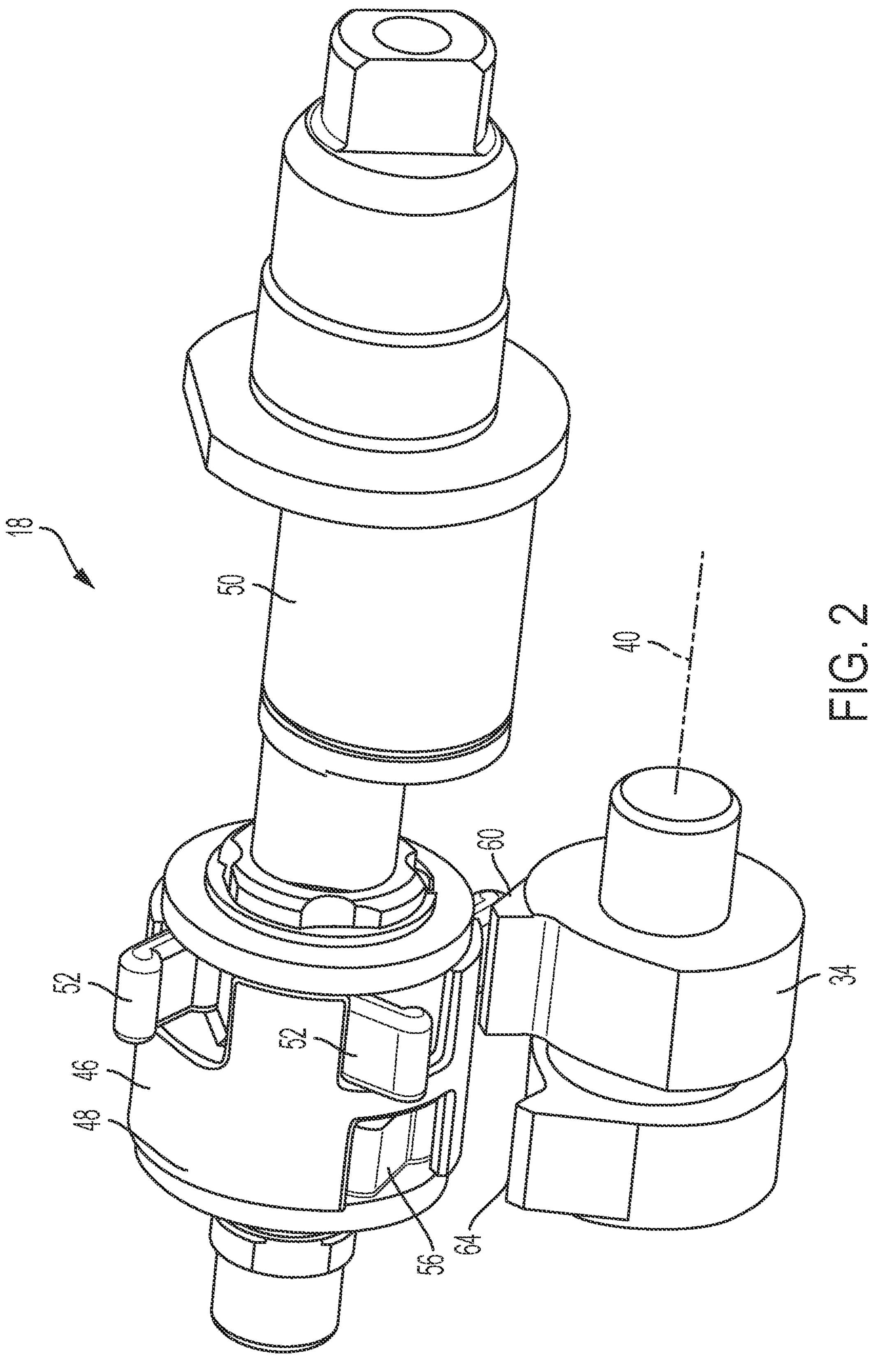
FIG. 2 is a perspective view of a rotary return valve of the power tool of FIG. 1A.
Figure 3:
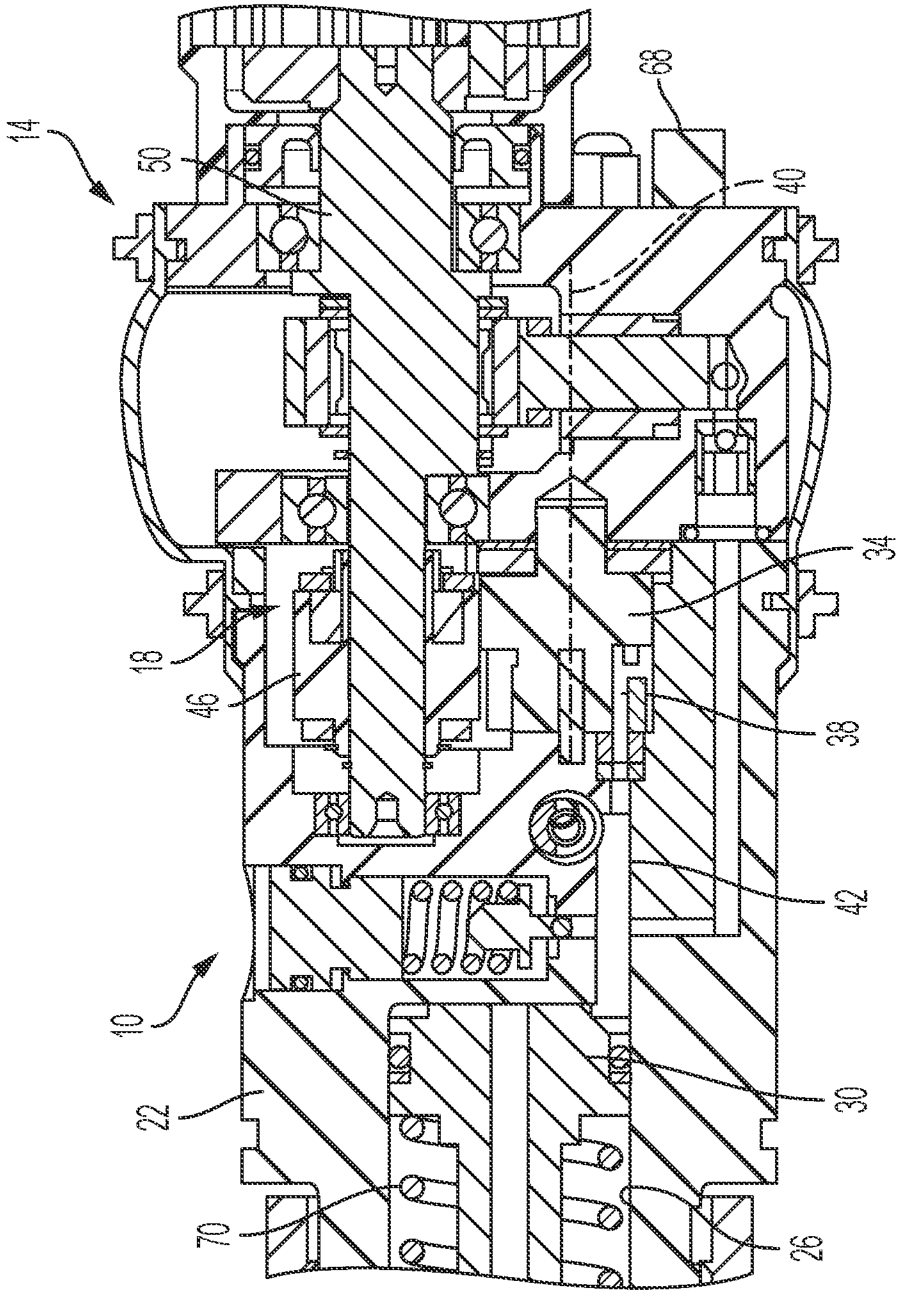
FIG. 3 is a portion of the power tool of FIG. 1A, illustrating the rotary return valve in an open position.

With reference to FIG. 2 and FIG. 3, an assembly 18 also includes a valve actuator 46 driven by an input shaft 50 of the pump 14 for selectively closing a return valve 34 with rotational axis 40 (e.g., when a return port 38 is misaligned with a return passageway 42) and opening the return valve 34 (e.g., when the return port 38 is aligned with the return passageway 42). The valve actuator 46 includes a generally cylindrical body 48 that accommodates a first set of pawls 52 and a second set of pawls 56. In other embodiments, the sets of pawls 52, 56 may include any other number of pawls.

The pawls 52, 56 are pivotally coupled to the body 48 and extend and retract from the body 48 in response to rotation of the input shaft 50. The pawls 52 extend when the input shaft 50 is driven in a clockwise direction, and the pawls 52 retract when the input shaft 50 is driven in a counter-clockwise direction. Conversely, the pawls 56 extend when the input shaft 50 is driven in the counter-clockwise direction, and retract when the input shaft 50 is driven in the clockwise direction. The pawls 52, 56 are selectively engageable with corresponding first and second radial projections 60, 64 on the return valve 34 to open and close the valve 34.

Prior to initiating a crimping operation, the return valve 34 is in an open position as shown in FIG. 3, in which the return port 38 is aligned with the return passageway 42 to fluidly communicate the piston cylinder 26 and the reservoir. In the open position, the pressure in the piston cylinder 26 is at approximately zero pounds per square inch (psi), the speed of the motor 12 is at zero revolutions per minute (rpm), and the current supplied to the motor 12 is zero amperes (A or amps). A rebounding spring 70 causes the piston 30 to retract into the cylinder 26.

Figure 4:
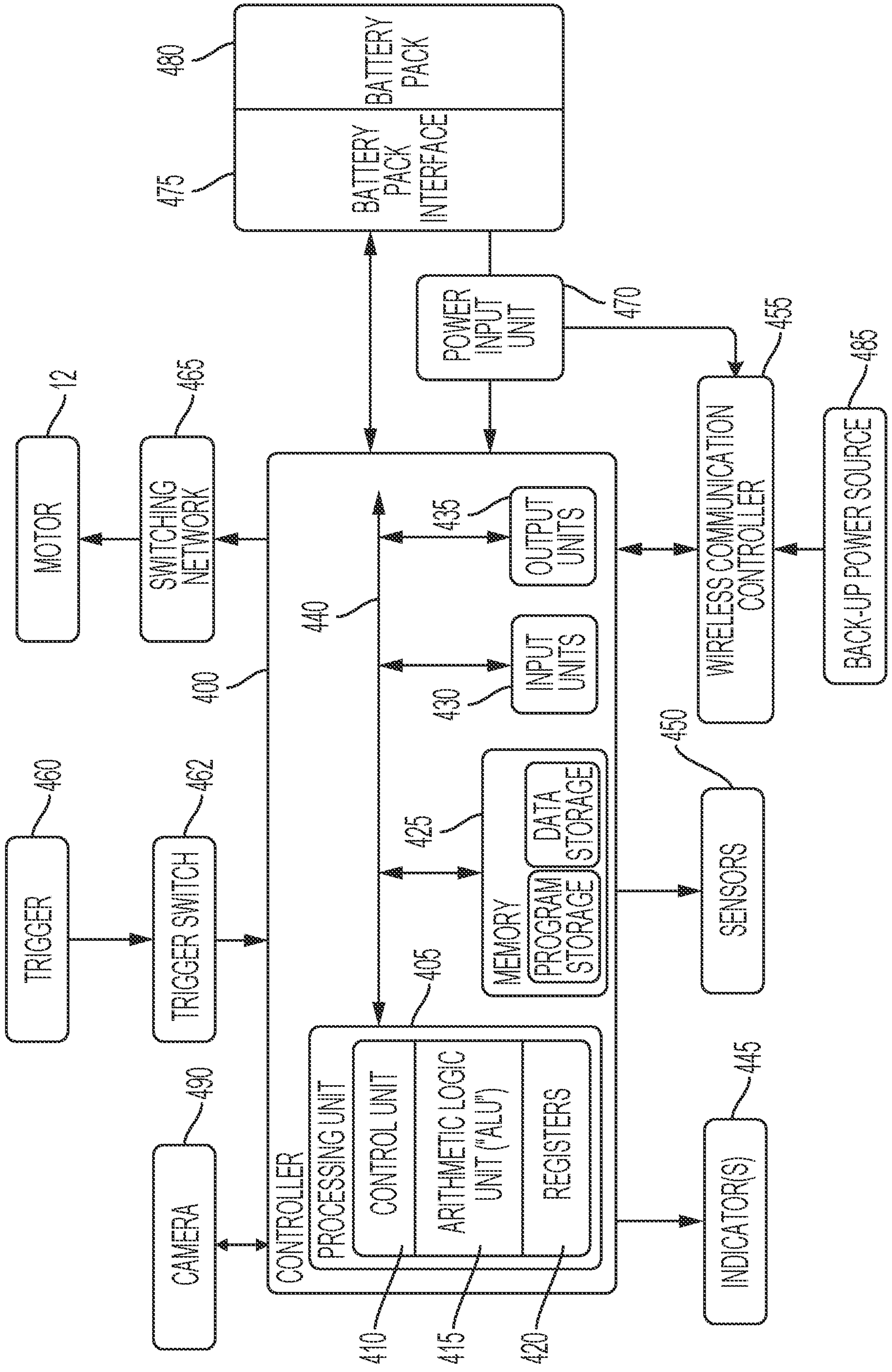
FIGS. 4 and 5 are block circuit diagrams of the power tool of FIG. 1A, FIG. 1B, or FIG. 1C.

The pressure in the piston cylinder 26 may be sensed by a pressure sensor 68 and the signals from the pressure sensor 68 are sent to the electronic control and monitoring circuitry (see, e.g., controller 400 of FIG. 4). The pressure sensor 68 may be referred to as a pressure transducer, a pressure transmitter, a pressure sender, a pressure indicator, a piezometer, or a manometer. The pressure sensor 68 is either an analog or digital pressure sensor. In some embodiments, the pressure sensor 68 is a force collector type of pressure sensor, such as piezoresistive strain gauge, capacitive sensor, electromagnetic sensor, piezoelectric sensor, optical sensor, or potentiometric sensor. In some embodiments, the pressure sensor 68 is manufactured out of piezoelectric materials, such as quartz. In other embodiments, the pressure sensor 68 is a resonant, thermal, or ionization type of pressure sensor.

The speed of the motor 12 is sensed by a speed sensor that detects the position and movement of a rotor relative to stator and generates signals indicative of motor position, speed, and/or acceleration, which are provided to the electronic control and monitoring circuitry. In some embodiments, the speed sensor includes a Hall effect sensor to detect the position and movement of the rotor magnets.

The electric current flow through the motor 12 is sensed, for example, by a current sensor (e.g., an ammeter) and the output signals from the current sensor are sent to the electronic control and monitoring circuitry. Alternatively, the current flow through the motor 12 can be derived from voltage, using a voltage sensor (e.g., a voltmeter), taken across the resistance of the windings in the motor 12. Other methods can also be used to calculate the electric current flow through the motor 12 with other types of sensors (e.g., a shunt resistor). The power tool 10 can include other sensors to control and monitor other characteristics of the other movable components of the power tool 10, such as the motor 12, pump 14, or piston 30. The electronic current flow through the motor 12 may be used to determine other characteristics of the motor 12, such as a torque of the motor 12.

The position of the crimper head 72, such as the jaws 32 or the die, may be sensed by a position sensor 150, illustrated in FIG. 1C. The position sensor 150 is, for example, a displacement sensor, a distance sensor, a photodiode array, a potentiometer, a proximity sensor, a Hall sensor, or the like. In some embodiments, a displacement or distance may be determined by a light sensor that measures the clarity of hydraulic fluid within the piston 30. As the piston 30 moves, the amount (for example, the intensity) of light received by the light sensor changes. In some embodiments, displacement is measured by a number of revolutions of the motor 12. Seal wear may also be accounted for when determining displacement. Seal wear may be determined based on the performed crimping application (described in more detail below) or based on a user input. Signals from the light sensor and/or other position sensors 150 may be directly used as an input for controller 400 (see FIG. 4) or may be transformed into distance, displacement, and/or position for analysis by the controller 400.

In some embodiments, the piston 30 includes a plurality of conductive rings (e.g., copper rings) situated around the piston 30. When the power tool 10 operates, the piston 30 and the conductive rings move within the piston cylinder 26. In some embodiments, the position sensor 150, which may be a Hall effect sensor situated within or near the piston cylinder 26, detects the distance by detecting the conductive rings moving with the piston 30. The further the piston 30 extends, the greater the number of conductive rings and distance detected by the position sensor 150. Based on the movement of the piston 30 during an operation of the power tool 10, the position sensor 150 generates an output signal representative of a distance that the piston 30 has traveled from a particular reference point, such as a proximal position or a home position. The output signal may be communicated to a controller 400 of the power tool 10, as illustrated in FIG. 4.

In some embodiments, the position sensor 150 also provides information regarding the direction of motion of the piston 30. For example, the position sensor 150 determines if the piston 30 is extending or retracting. In some embodiments, the position sensor 150 continuously senses the movement of the piston 30. In some embodiments, the position sensor 150 is only activated during a period of time the piston 30 is being driven.

The controller 400 for the power tool 10 is illustrated in FIG. 4. The controller 400 is electrically and/or communicatively connected to a variety of modules or components of the power tool 10. For example, the illustrated controller 400 is connected to indicators 445, sensors 450 (which may include, for example, the pressure sensor 68, the speed sensor, the current sensor, the voltage sensor, the position sensor 150, etc.), a wireless communication controller 455, a trigger switch 462, a switching network 465, a power input unit 470, and a battery pack interface 475.

The controller 400 includes a plurality of electrical and electronic components that provide power, operational control, and protection to the components and modules within the controller 400 and/or power tool 10. For example, the controller 400 includes, among other things, a processing unit 405 (e.g., a microprocessor, an electronic processor, an electronic controller, a microcontroller, or another suitable programmable device), a memory 425, input units 430, and output units 435. The processing unit 405 includes, among other things, a control unit 410, an arithmetic logic unit ("ALU") 415, and a plurality of registers 420 (shown as a group of registers in FIG. 4), and is implemented using a known computer architecture (e.g., a modified Harvard architecture, a von Neumann architecture, etc.). The processing unit 405, the memory 425, the input units 430, and the output units 435, as well as the various modules connected to the controller 400 are connected by one or more control and/or data buses (e.g., common bus 440). The control and/or data buses are shown generally in FIG. 4 for illustrative purposes. The use of one or more control and/or data buses for the interconnection between and communication among the various modules and components would be known to a person skilled in the art in view of the embodiments described herein.

The memory 425 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 405 is connected to the memory 425 and executes software instructions that are capable of being stored in a RAM of the memory 425 (e.g., during execution), a ROM of the memory 425 (e.g., on a generally permanent basis), or another non-transitory computer readable medium such as another memory or a disc. Software included in the implementation of the power tool 10 can be stored in the memory 425 of the controller 400. The software includes, for example, firmware, one or more applications, program data, filters, rules, one or more program modules, and other executable instructions. The controller 400 is configured to retrieve from the memory 425 and execute, among other things, instructions related to the control processes and methods described herein. In other embodiments, the controller 400 includes additional, fewer, or different components.

In some embodiments, as described above, the power tool 10 is a crimper. The controller 400 drives the motor 12 to perform a crimp in response to a user's actuation of the trigger 460. Depression of the activation trigger 460 actuates a trigger switch 462, which outputs a signal to the controller 400 to actuate the crimp. The controller 400 controls a switching network 465 (e.g., a FET switching bridge) to drive the motor 12. When the trigger 460 is released, the trigger switch 462 no longer outputs the actuation signal (or outputs a released signal) to the controller 400. The controller 400 may cease a crimp action when the trigger 460 is released by controlling the switching network 465 to brake the motor 12.

The battery pack interface 475 is connected to the controller 400 and couples to a battery pack 480. The battery pack interface 475 includes a combination of mechanical (e.g., a battery pack receiving portion) and electrical components configured to and operable for interfacing (e.g., mechanically, electrically, and communicatively connecting) the power tool 10 with the battery pack 480. The battery pack interface 475 is coupled to the power input unit 470. The battery pack interface 475 transmits the power received from the battery pack 480 to the power input unit 470. The power input unit 470 includes active and/or passive components (e.g., voltage step-down controllers, voltage converters, rectifiers, filters, etc.) to regulate or control the power received through the battery pack interface 475 and to the wireless communication controller 455 and controller 400. When the battery pack 480 is not coupled to the power tool 10, the wireless communication controller 455 is configured to receive power from a back-up power source 485.

The indicators 445 are also coupled to the controller 400 and receive control signals from the controller 400 to turn ON and OFF or otherwise convey information based on different states of the power tool 10. The indicators 445 include, for example, one or more light-emitting diodes (LEDs), a display screen, etc. The indicators 445 can be configured to display conditions of, or information associated with, the power tool 10. For example, the indicators 445 can display information relating to a type of operation or application (such as a type of crimping application) performed by the power tool 10, a status of the operation, the success or failure of the operation, etc. In addition to or in place of visual indicators, the indicators 445 may also include a speaker or a tactile feedback mechanism to convey information to a user through audible or tactile outputs.

In some embodiments, a camera (or scanner) 490 is coupled to the controller 400. The camera 490 may be configured to scan, read, or otherwise receive an RFID tag or visual identifier (such as a QR code or a bar code) on or associated with a crimp and/or a die received by the power tool 10. In some embodiments, the camera 490 is a modular device configured to attach to the power tool 10. The camera 490 may have its own power source, or may be powered by the battery pack 480. The camera 490 may be rotatable around the power tool 10 based on a direction of the crimping application being performed. In some embodiments, the camera 490 includes an accelerometer (or communicates with an accelerometer included in the sensors 450) to self-right an image taken by the camera 490. Additionally, the camera 490 may be wired to communicate with the controller 400 and receive power from the controller 400. However, in some embodiments, the camera 490 may wirelessly communicate with the controller 400, such as via a Bluetooth connection. In some embodiments, the camera 490 is configured to communicate with components within the communication system 600 (see FIG. 6). The visual identifier associated with each crimp or die may be unique. Accordingly, the controller 400 may track a number of crimp types based on the visual identifiers of each crimp and die. Each visual identifier may be associated with a location. Image analysis methods, such as optical character recognition (OCR), may be used by the controller 400 to analyze the visual identifiers. Crimps and die with visual identifiers and/or RFID tags may be used for reinforcement learning of machine learning control 710 (described in more detail below). In some embodiments, the camera 490 may provide an image output that is run through a machine learning classifier, such as a CNN or attention network. The CNN or attention network directly classifies the crimp and/or die. In some embodiments, this is achieved even without OCR because the crimp and die may be secured in a known position or orientation relative to the camera 490.

In some embodiments, the memory 425 includes die data, which specifies one or more of the type of die (e.g., the size and material of the die) attached to the body 1, the workpiece size, the workpiece shape, the workpiece material, the application type (e.g., electrical or plumbing), varieties of types of die compatible with the power tool 10, etc. The memory 425 can also include expected curve data, which is described in more detail below. In some embodiments, the die data is communicated to and stored in the memory 425 via an external device 605 (see FIG. 6). In some embodiments, the die data is stored in a look-up table in the memory 425. The memory 425 may further store information relating to the manufacturer of the power tool 10. In some embodiments, the power tool 10 and/or the external device 605 includes a global positioning system ("GPS") for determining a specific location of the power tool 10 and/or the external device 605. The location of the power tool 10 and/or the external device 605 can then be correlated to a particular worksite where required operations of the power tool 10 were to be performed. Using the techniques described herein, the operations of the power tool 10 can be automatically identified or determined and associated with the location of the power tool 10 and/or external device 605 to confirm that all of the required, particular operations of the power tool were performed at the proper location. Such documentation used to guarantee that a job was completed properly, can be used to automatically generate a compliance report for the specific location/operations, etc.

Figure 5:
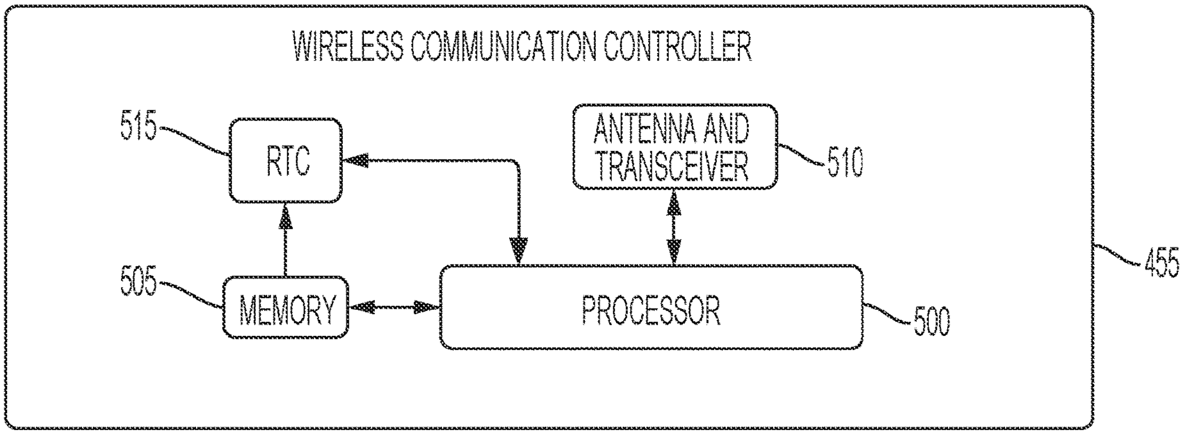

As shown in FIG. 5, the wireless communication controller 455 includes a processor 500, a memory 505, an antenna and transceiver 510, and a real-time clock (RTC) 515. The wireless communication controller 455 enables the power tool 10 to communicate with an external device 605 (see, e.g., FIG. 6). The radio antenna and transceiver 510 operate together to send and receive wireless messages to and from the external device 605 and the processor 500. The memory 505 can store instructions to be implemented by the processor 500 and/or may store data related to communications between the power tool 10 and the external device 605 or the like. The processor 500 for the wireless communication controller 455 controls wireless communications between the power tool 10 and the external device 605. For example, the processor 500 associated with the wireless communication controller 455 buffers incoming and/or outgoing data, communicates with the controller 400, and determines the communication protocol and/or settings to use in wireless communications. The communication via the wireless communication controller 455 can be encrypted to protect the data exchanged between the power tool 10 and the external device 605 from third parties.

In the illustrated embodiment, the wireless communication controller 455 is a Bluetooth® controller. The Bluetooth® controller communicates with the external device 605 employing the Bluetooth® protocol. Therefore, in the illustrated embodiment, the external device 605 and the power tool 10 are within a communication range (i.e., in proximity) of each other while they exchange data. In other embodiments, the wireless communication controller 455 communicates using other protocols (e.g., Wi-Fi, ZigBee, a proprietary protocol, etc.) over different types of wireless networks. For example, the wireless communication controller 455 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 455 is configured to receive data from the controller 400 and relay the information to the external device 605 via the antenna and transceiver 510. In a similar manner, the wireless communication controller 455 is configured to receive information (e.g., configuration and programming information) from the external device 605 via the antenna and transceiver 510 and relay the information to the controller 400.

The RTC 515 can increment and keep time independently of the other power tool 10 components. The RTC 515 can receive power from the battery pack 480 when the battery pack 480 is connected to the power tool 10 and can receive power from the back-up power source 485 when the battery pack 480 is not connected to the power tool 10. Having the RTC 515 as an independently powered clock enables time stamping of operational data (stored in memory 505 for later export) and a security feature whereby a lockout time is set by a user (e.g., via the external device 605) and the tool is locked-out when the time of the RTC 515 exceeds the set lockout time.

Figure 6:
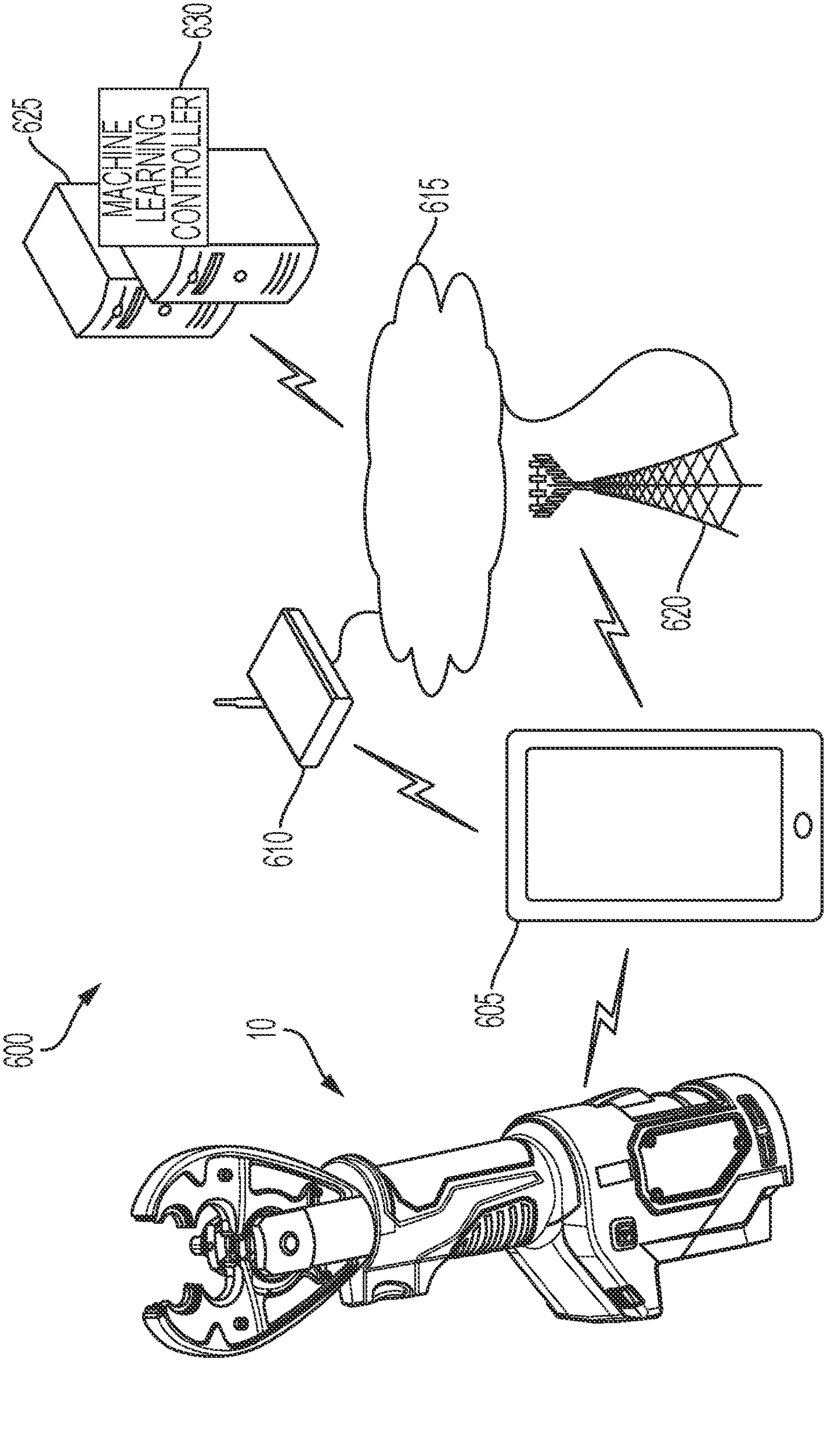
FIG. 6 is a communication system for the power tool of FIG. 1A, FIG. 1B, or FIG. 1C and an external device in accordance with an embodiment described herein.

FIG. 6 illustrates a communication system 600. The communication system 600 includes at least one power tool 10 (illustrated as a crimper) and the external device 605. Each power tool device 10 (e.g., a crimper, a cutter, a battery powered impact driver, a power tool battery pack, and the like) and the external device 605 can communicate wirelessly while they are within a communication range of each other. Each power tool 10 may communicate power tool status, power tool operation statistics, power tool identification, power tool sensor data, stored power tool usage information, power tool maintenance data, and the like.

More specifically, the power tool 10 can monitor, log, and/or communicate various tool parameters that can be used for confirmation of correct tool performance, detection of a malfunctioning tool, and determination of a need or desire for service. Taking, for example, the crimper as the power tool 10, the various tool parameters detected, determined, and/or captured by the controller 400 and output to the external device 605 can include a crimping time (e.g., time it takes for the power tool 10 to perform a crimping action), a type of die received by the power tool 10, a type of application performed by the power tool 10, a time (e.g., a number of seconds) that the power tool 10 is on, a number of overloads (i.e., a number of times the power tool 10 exceeded the pressure rating for the die, the jaws 32, and/or the power tool 10), a total number of cycles performed by the tool, a number of cycles performed by the tool since a reset and/or since a last data export, a number of full pressure cycles (e.g., number of acceptable crimps performed by the power tool 10), a number of remaining service cycles (i.e., a number of cycles before the power tool 10 should be serviced, recalibrated, repaired, or replaced), a number of transmissions sent to the external device 605, a number of transmissions received from the external device 605, a number of errors generated in the transmissions sent to the external device 605, a number of errors generated in the transmissions received from the external device 605, a code violation resulting in a master control unit (MCU) reset, a short in the power circuitry (e.g., a metal-oxide-semiconductor field-effect transistor (MOSFET) short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a motor stall condition (i.e., a locked or non-moving rotor with an electrical current flowing through the windings), a bad Hall sensor, a non-maskable interrupt (NMI) hardware MCU Reset (e.g., of the controller 400), an over-discharge condition of the battery pack 480, an over-current condition of the battery pack 480, a battery dead condition at trigger pull, a tool FETing condition, gate drive refresh enabled indication, thermal and stall overload condition, a malfunctioning pressure sensor condition for the pressure sensor 68, trigger pulled at tool sleep condition, Hall sensor error occurrence condition for one of the Hall sensors, heat sink temperature histogram data, MOSFET junction temperature histogram data, peak current histogram data (from the current sensor), average current histogram data (from the current sensor), the number of Hall errors indication, raw sensor values, encoded sensor values (for example, from an RNN encoder), compressed sensor values, operating parameters of the power tool 10, etc.

Using the external device 605, a user can access the tool parameters obtained by the power tool 10. With the tool parameters (i.e., tool operational data), a user can determine how the power tool 10 has been used (e.g., number of crimps performed, a type of crimp application performed), whether maintenance is recommended or has been performed in the past, and identify malfunctioning components or other reasons for certain performance issues. The external device 605 can also transmit data to the power tool 10 for power tool configuration, firmware updates, or to send commands. The external device 605 also allows a user to set operational parameters, safety parameters, select usable dies, select tool modes, and the like for the power tool 10.

The external device 605 is, for example, a smart phone (as illustrated), a laptop computer, a tablet computer, a personal digital assistant (PDA), or another electronic device capable of communicating wirelessly with the power tool 10 and providing a user interface. The external device 605 provides the user interface and allows a user to access and interact with the power tool 10. The external device 605 can receive user inputs to determine operational parameters, enable or disable features, and the like. The user interface of the external device 605 provides an easy-to-use interface for the user to control and customize operation of the power tool 10. The external device 605, therefore, grants the user access to the tool operational data of the power tool 10, and provides a user interface such that the user can interact with the controller 400 of the power tool 10.

In addition, as shown in FIG. 6, the external device 605 can also share the tool operational data obtained from the power tool 10 with a remote server 625 connected through a network 615. The remote server 625 may be used to store the tool operational data obtained from the external device 605, provide additional functionality and services to the user, or a combination thereof. In some embodiments, storing the information on the remote server 625 allows a user to access the information from a plurality of different locations. In some embodiments, the remote server 625 collects information from various users regarding their power tool devices and provide statistics or statistical measures to the user based on information obtained from the different power tools. For example, the remote server 625 may provide statistics regarding the experienced efficiency of the power tool 10, typical usage of the power tool 10, and other relevant characteristics and/or measures of the power tool 10. The network 615 may include various networking elements (routers 610, hubs, switches, cellular towers 620, wired connections, wireless connections, etc.) for connecting to, for example, the Internet, a cellular data network, a local network, or a combination thereof as previously described. In some embodiments, the power tool 10 is configured to communicate directly with the remote server 625 through an additional wireless interface or with the same wireless interface that the power tool 10 uses to communicate with the external device 605.

In some embodiments, the remote server 625 includes a machine learning controller 630. The machine learning controller 630 implements a machine learning program. For example, the machine learning controller 630 is configured to construct a model (e.g., building one or more algorithms) based on example inputs. Supervised learning involves presenting a computer program with example inputs and their actual outputs (e.g., categorizations). The machine learning controller 630 is configured to learn a general rule or model that maps the inputs to the outputs based on the provided example input-output pairs. The machine learning algorithm may be configured to perform machine learning using various types of methods. For example, the machine learning controller 630 may implement the machine learning program using decision tree learning (such as random decision forests), associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others, such as those listed in Table 1 below. In some embodiments the machine learning program is implemented by the controller 400, the external device 605, or a combination of the controller 400, the external device 605, and/or the machine learning controller 630.

TABLE 1

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naïve Bayes, attention networks, transformer networks, etc. |

The machine learning controller 630 is programmed and trained to perform a particular task. For example, in some embodiments, the machine learning controller 630 is trained to identify an application (or operation) performed by the power tool 10. The application performed by the power tool 10 may vary based on, for example, the type of die inserted into the power tool 10 or a setting of the power tool. The training examples used to train the machine learning controller 630 may be graphs or tables of operating profiles, such as pressure over time, voltage over time, current over time, speed over time, and the like for a given application. The training examples may be previously collected training examples, from, for example, a plurality of the same type of power tools. For example, the training examples may have been previously collected from a plurality of power tools of the same type (e.g., crimpers) over a span of, for example, one year.

A plurality of different training examples is provided to the machine learning controller 630. The machine learning controller 630 uses these training examples to generate a model (e.g., a rule, a set of equations, and the like) that helps categorize or estimate the output based on new input data. The machine learning controller 630 may weight different training examples differently to, for example, prioritize different conditions or inputs and outputs to and from the machine learning controller 630. For example, certain observed operating characteristics may be weighed more heavily than others, such as the hydraulic work being weighted more than the average derivative of the pressure.

In one example, the machine learning controller 630 implements an artificial neural network. The artificial neural network includes an input layer, a plurality of hidden layers or nodes, and an output layer. Typically, the input layer includes as many nodes as inputs provided to the machine learning controller 630. As described above, the number (and the type) of inputs provided to the machine learning controller 630 may vary based on the particular task for the machine learning controller 630. Accordingly, the input layer of the artificial neural network of the machine learning controller 630 may have a different number of nodes based on the particular task for the machine learning controller 630. The input layer connects to the hidden layers. The number of hidden layers varies and may depend on the particular task for the machine learning controller 630. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 630, but may also vary based on the specific type of hidden layer implemented.

Each hidden layer may perform a different function. For example, some hidden layers can be convolutional hidden layers which can, in some instances, reduce the dimensionality of the inputs, while other hidden layers can perform statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training algorithms can be used to adjust the bias values and the weights of the node connection based on the training examples. The training algorithms may include, for example, gradient descent, newton's method, conjugate gradient, quasi newton, and levenberg marquardt, among others.

In another example, the machine learning controller 630 implements a support vector machine to perform classification. The machine learning controller 630 may receive inputs from the sensors 450, such as the pressure of the piston cylinder 26, the motor speed, the motor energy, operation time, and the like. The machine learning controller 630 then defines a margin using combinations of some of the input variables as support vectors to maximize the margin. In some embodiments, the machine learning controller 630 defines a margin using combinations of more than one of similar input variables. The margin corresponds to the distance between the two closest vectors that are classified differently. For example, the margin corresponds to the distance between a vector representing a 120 circular mil ("MCM") Aluminum ("Al") crimping application and a vector representing a 120 MCM copper ("Cu") crimping application. In some embodiments, the machine learning controller 630 uses more than one support vector machine to perform a single classification. For example, when the machine learning controller 630 determines the power tool 10 is performing the 120 MCM Al crimping application, a first support vector machine determines the 120 MCM Al crimping application based on the hydraulic work and the touch off percent, while a second support vector machine determines the 120 MCM Al crimping application based on the touch off time and the touch off percent. The machine learning controller 630 may then determine whether the 120 MCM Al crimping application is being performed when both support vector machines classify the application as the 120 MCM Al crimping application. In other embodiments, a single support vector machine can use more than two input variables and define a hyperplane that separates the types of applications.

The training examples for a support vector machine include an input vector including values for the input variables (e.g., pressure of the piston cylinder 26, motor voltage, motor current, motor speed, position of the jaws 32, and the like), and an output classification indicating the crimping application performed by the power tool 10. During training, the support vector machine selects the support vectors (e.g., a subset of the input vectors) that maximize the margin. In some embodiments, the support vector machine may be able to define a line or hyperplane that accurately separates the types of applications. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data. In other embodiments, as mentioned above, the machine learning controller 630 can implement different machine learning algorithms to make an estimation or classification based on a set of input data. For example, a random forest classifier may be used, in which multiple decision trees are implemented to observe different operational features of the power tool 10. Each decision tree has its own output, and majority voting may be used to determine the final output of the machine learning controller 630.

Figure 7:
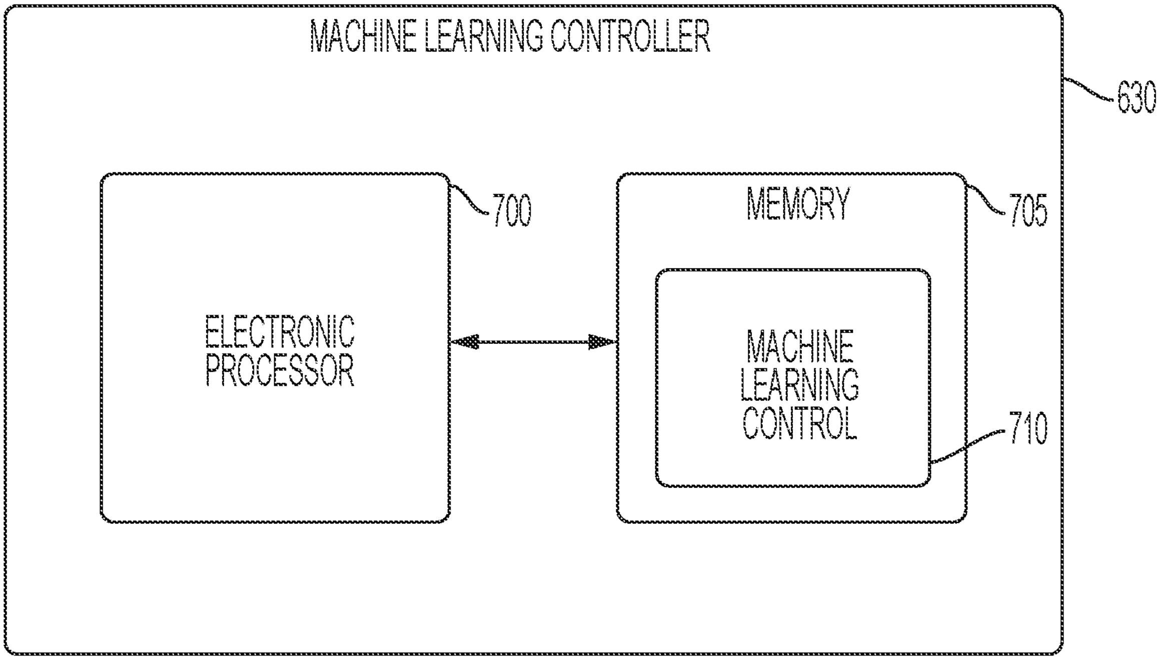
FIG. 7 illustrates a block diagram of a machine learning controller in accordance with an embodiment described herein.

As shown in FIG. 7, the machine learning controller 630 includes a machine learning electronic processor 700 and a machine learning memory 705. The machine learning memory 705 stores a machine learning control 710. The machine learning control 710 may include a trained machine learning program as described above with respect to FIG. 6. In some embodiments, the trained machine learning program is instead stored in the memory 425 of the power tool 10 and implemented by the processing unit 405. As discussed above with respect to FIG. 6, the machine learning control 710 may be built and operated by the remote server 625. In other embodiments, the machine learning control 710 may be built by the remote server 625, but implemented by the power tool 10. In yet other embodiments, the power tool 10 (e.g., the controller 400) builds and implements the machine learning control 710. In yet other embodiments, the machine learning control 710 is built on and/or implemented by an intermediate device, such as a phone, tablet (e.g., the external device 605), gateway, hub, or other power tool separate from the power tool 10.

Figure 8:
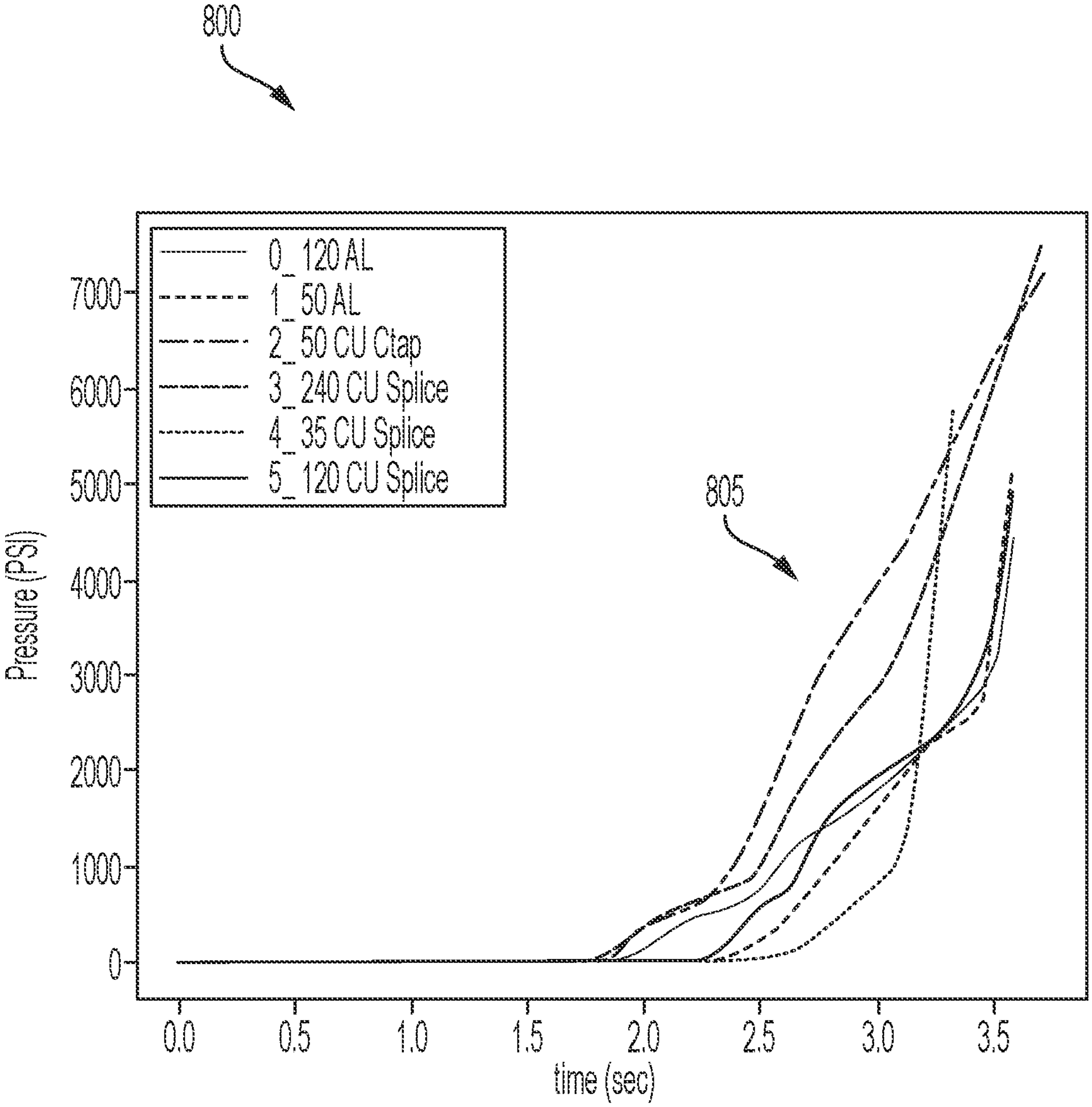
FIG. 8 illustrates a graph of pressure profiles of the power tool of FIG. 1A, FIG. 1B, or FIG. 1C in accordance with embodiments described herein.

To train the machine learning control 710, the machine learning controller 630 may be provided with a plurality of application profiles 805, as shown in graph 800 of FIG. 8. The plurality of application profiles 805 illustrated includes a 120 MCM Al crimping profile, a 50 MCM Al crimping profile, a 50 MCM Cu Ctap profile, a 240 MCM Cu Splice profile, a 35 MCM Cu Splice profile, and a 120 MCM Cu Splice profile, but additional application profiles may also be included in the plurality of application profiles 805. Additionally, while illustrated as a graph 800, the application profiles 805 can also correspond to tables of values or other sets of numerical values that represent the application profiles 805. Each application profile 805 provides, for example, an expected change in the pressure of the piston cylinder 26 over time as the corresponding crimping application is performed by the power tool 10. Additionally each application profile may be labelled such that the machine learning controller 630 can learn the expected profile for each application. While only pressure profiles are illustrated, other profiles may be used to train the machine learning control 710, such as a voltage profile, a current profile, a position profile, and the like.

In embodiments where the machine learning program is implemented by the controller 400 (e.g., locally on the power tool 10), the machine learning control 710 may require firmware or memory updates. Accordingly, a prompt asking a user to update the machine learning program may be provided via the indicators 445 or on a display of the external device 605. Additionally, a user may provide feedback to the machine learning program via the external device 605, such as confirming typical or popular crimping applications performed by the power tool 10.

Returning to FIG. 1B, when a crimping operation is initiated (e.g., by pressing a motor activation trigger 460 of the power tool 10), the input shaft 50 is driven by the motor 12 in a counter-clockwise direction, thereby rotating the valve actuator 46 counter-clockwise. In some embodiments, the electric current flow through the motor 12 initially increases with in rush current and then drops to a steady state current flow. As the valve actuator 46 rotates counter-clockwise, rotational or centrifugal forces cause the second set of pawls 56 to extend from the body 48 and the first set of pawls 52 to retract into the body 48. As the input shaft 50 continues to rotate, one of the pawls 56 engages the second radial projection 64, rotating the return valve 34 clockwise from the open position to a closed position in which the return port 38 is misaligned with the return passageway 42.

Each type of die (e.g., size and shape) for a particular power tool 10 along with the type of workpiece material (e.g., malleable metal) can correspond to different piston cylinder pressures, motor speeds, motor currents, and other characteristics over the time the crimp is being performed (e.g., the crimper head 72 is closing and opening). These characteristics (e.g., piston cylinder pressure, motor speed, ram distance, motor current, etc.) are used to monitor, analyze, and evaluate the activity of the power tool 10. For instance, by monitoring these characteristics, the controller 400 may determine the type of die used, the operation or application performed by the power tool 10, or the like. This may, for example, assist in confirming the correct type of die was used on a workpiece.

Figure 9:
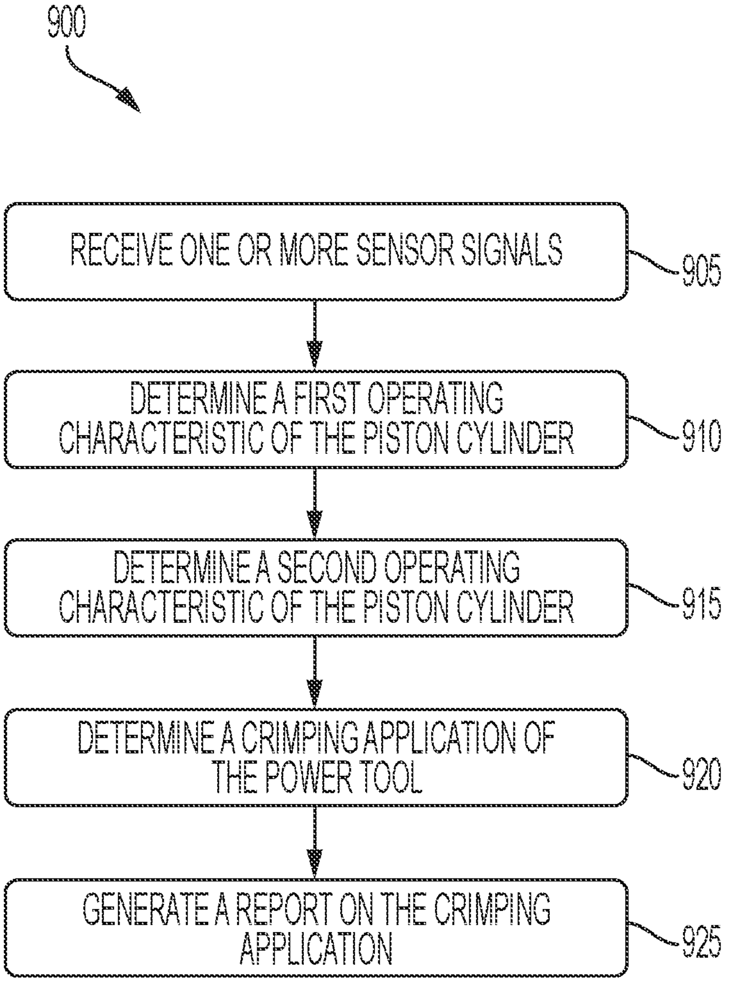
FIG. 9 illustrates a block diagram of a method performed by a controller in accordance with an embodiment described herein.

FIG. 9 provides a method 900 for determining a crimping application performed by the power tool 10. The steps of the method 900 are shown for illustrative purposes. The controller 400 can perform one or more of the steps in an order different than that shown in FIG. 9, or one or more steps of the method 900 can be removed from the method 900. Additionally, the method 900 may be performed by the controller 400 in conjunction with the machine learning controller 630.

Conventionally, a controller or power tool does not include a technical solution to categorizing or labeling a particular crimping application. Rather, a user of the tool would have to manually record or make note of what crimping action is being performed. The efficiency of completing operations at a worksite would be significantly improved if a power tool or controller were capable of receiving a variety of sensor inputs and, based on those sensor inputs, identify a specific type of operation (e.g., a particular type of crimp operation) that was performed by the power tool without user intervention. By automatically identifying what type of operation has been performed by the power tool, a user of the power tool can formally document what operations were performed, verify that the correct number of operations were performed, and that each operation satisfied technical requirements for the operation (e.g., maximum output pressure achieved, etc.). Indications can then be provided to the user (e.g., through the power tool 10 display or indicator, the external device 605's display, a generated report that is disseminated specifically to the power tool 10 or the user's external device 605 associated with an account on the remote server 625, etc.). For example, the power tool 10 may provide a visual indication of when a required number of a particular operation has been performed, or the power tool 10 may be stopped (e.g., prevented from performing further operations as a result of the required number of the particular operation having been performed). In some embodiments, a setting of the power tool 10 is changed after the required number of the particular operation have been performed (e.g., corresponding to a subsequent particular operation that is required to be performed). All of these control or notification features associated with the power tool 10 are technically implemented using the operation determination techniques described herein.

At step 905, the controller 400 and/or the machine learning controller 630 receives one or more sensor signals. For example, the controller 400 may receive pressure signals from the pressure sensor 68 indicating a pressure in the piston cylinder 26. The controller 400 may receive speed signals from the speed sensor indicative of the speed of the motor 12. The controller 400 may receive current signals from the current sensor indicative of the electric current flow through the motor 12. The controller 400 may receive positions sensors from the position sensor 150 indicative of the position of the crimper head 72. As the controller 400 receives the sensor signals, the controller 400 may monitor the change in the sensor signals over time. In some embodiments, the pressure in the piston cylinder 26 is estimated, substituted, and/or combined with the input current, motor torque, and/or other torque within the power tool 10. Additionally, when analyzing the pressure, current, and torque inputs, the controller 400 may account for leakages and other losses in the pressure, current, and torque.

At step 910, the controller 400 and/or the machine learning controller 630 determines a first operating characteristic of the piston cylinder 26. The first operating characteristic may be based on the pressure signals received from the pressure sensor 68, such as the hydraulic work (e.g., time average pressure), contact distance (e.g., touch off percent), a maximum time derivative of pressure, an average time derivative of pressure, a minimum time derivative of pressure, a negative time derivative of pressure, a touch off time, a total operating time, an average time derivative of pressure, or an average second time derivative of pressure. In some embodiments, the first operating characteristic is based on the position signals received from the position sensor 150, such as a total distance travelled by the jaws 32 and/or the piston cylinder 26. In some embodiments, the first operating characteristic is based on voltage signals from the voltage sensor and current signals from the current sensor. For example, the total energy provided to the motor 12 may be determined based on the voltage signals and the current signals. In some embodiments, the first operating characteristic is based on a combination of various sensor signals.

At step 915, the controller 400 and/or the machine learning controller 630 determines a second operating characteristic of the piston cylinder 26. The second operating characteristic may be any of those listed above with respect to the first operating characteristic. However, the second operating characteristic may be different than the first operating characteristic.

Figure 10A:
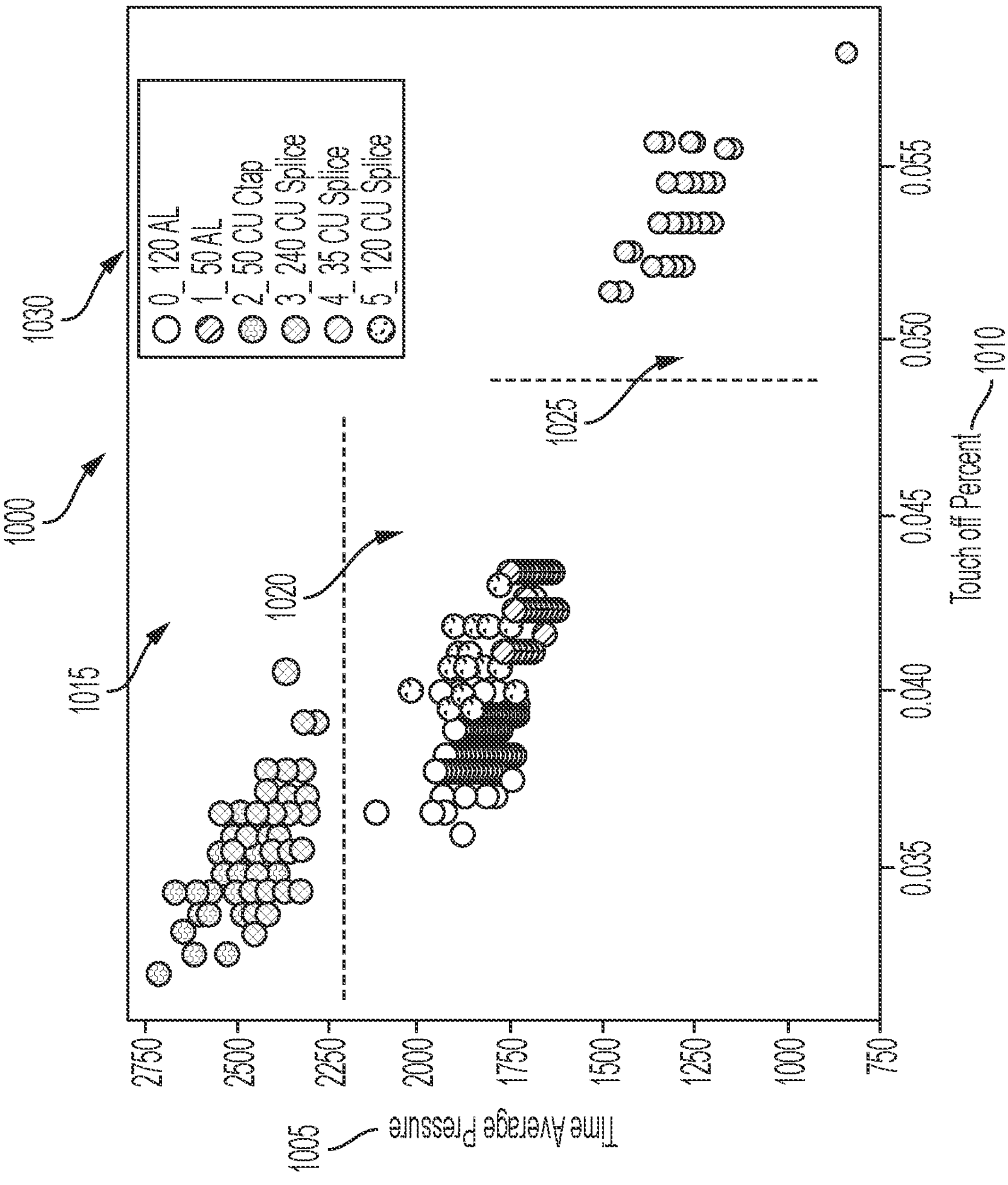
FIGS. 10A-10C illustrate scatter plots of operating characteristics of the power tool of FIG. 1A in accordance with embodiments described herein.
Figure 10B:
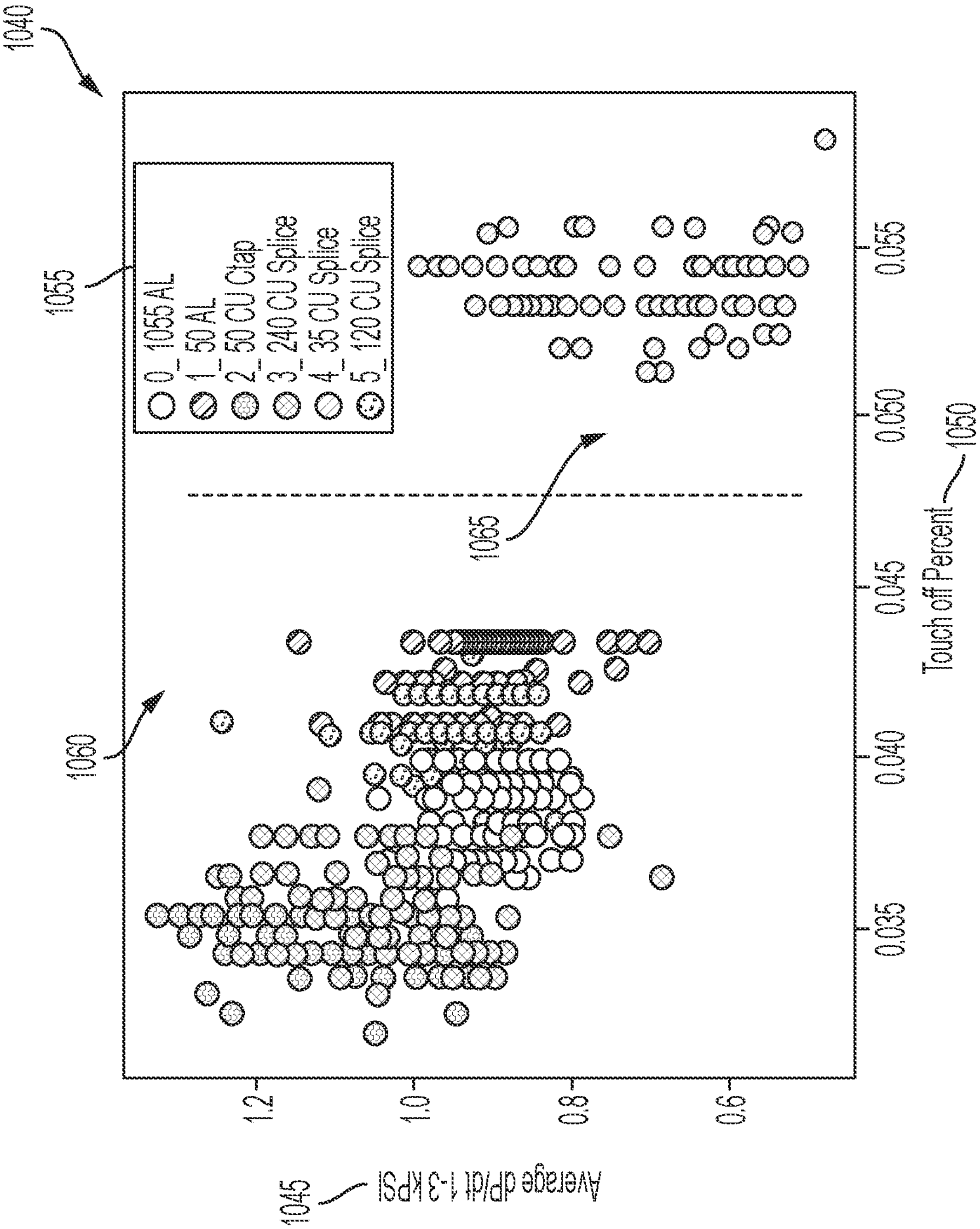
Figure 10C:
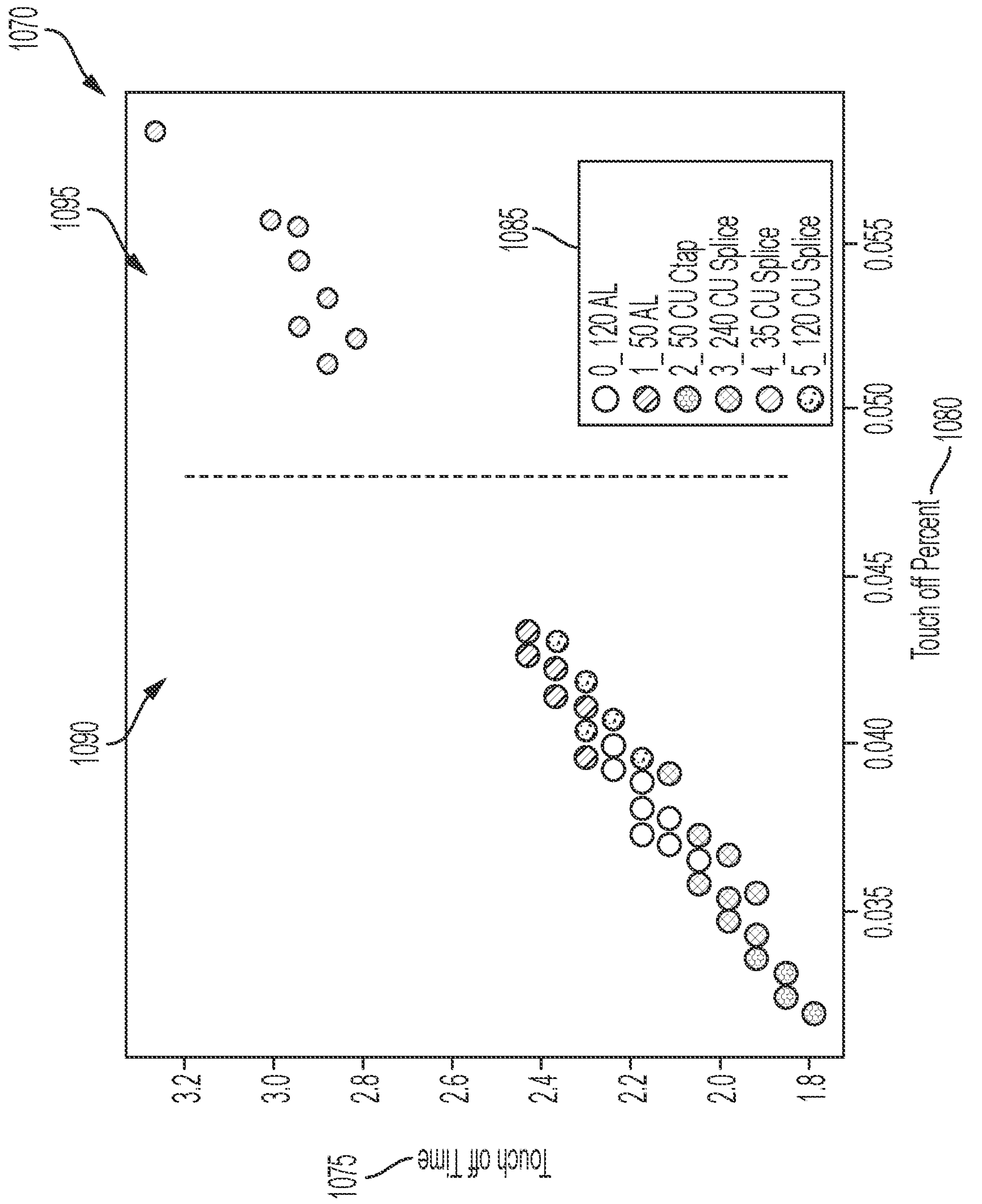

At step 920, the controller 400 and/or the machine learning controller 630 determines the crimping application of the power tool 10. In one embodiment, the controller 400 and/or the machine learning controller 630 compares the first operating characteristic and the second operating characteristic to the plurality of application profiles 805. For example, the FIGS. 10A-10C provide a variety of pressure profiles plotted according to the selected first operating characteristic and the selected second operating characteristic. FIG. 10A illustrates a first graph 1000 with a first operating characteristic 1005 on the y-axis and a second operating characteristic 1010 on the x-axis. In the example of FIG. 10A, the first operating characteristic 1005 is the time average pressure (e.g., the hydraulic work), and the second operating characteristic 1010 is the touch off percent (e.g., the contact distance). A plurality of crimping applications are graphed according to the value of their hydraulic work and their contact distance, as determined by the sensor signals.

The controller 400 and/or the machine learning controller 630 can compare the measured first operating characteristic and the measured second operating characteristic with expected values to determine a probability of a particular crimping application having been performed. For example, FIG. 10A provides a first region 1015, a second region 1020, and a third region 1025 defined by values of the time average pressure and the touch off percent. Specifically, the first region 1015 is defined by a time average pressure of greater than approximately 2200 (e.g., as determined by the machine learning controller 630). The second region 1020 is defined by a time average pressure of less than approximately 2200 and a touch off percent of less than approximately 0.048 (e.g., as determined by the machine learning controller 630). The third region 1025 is defined by a time average pressure of less than approximately 2200 and a touch off percent of greater than approximately 0.048.

By comparing the measured time average pressure and the measured touch off percent to the expected values within the first region 1015, the second region 1020, and the third region 1025 as the power tool 10 operates, the controller 400 and/or the machine learning controller 630 may determine the crimping application that was performed. For example, should the measured time average pressure be greater than 2200, the performed application is either the 50 MCM Cu Ctap or the 240 MCM Cu Splice (as provided by legend 1030). If the measured time average pressure is less than 2200 and the touch off percent is less than 0.048, the performed application is either the 120 MCM Al crimp, the 150 MCM Cu splice, or the 50 MCM Al crimp (provided by legend 1030). If the measured time average pressure is less than 2200 and the measured touch off percent is greater than 0.048, the performed application is the 35 MCM Cu splice.

When several possible applications lie within the same region (such as the first region 1015 and the second region 1020), the controller 400 and/or the machine learning controller 630 may determine a probability of each application. For example, when the measured time average pressure is 1750 and the touch off percent is 0.040, the controller 400 and/or the machine learning controller 630 may determine there is a 50% probability the crimping application is a 120 MCM Al crimp, a 40% probability the crimping application is a 120 MCM Al splice, and a 10% probability the crimping application is a 50 MCM Al crimp. The determined crimping application may be the crimping application with the highest probability. In some embodiments, the controller 400 or machine learning controller 630 can also be used to diagnose and report a reason for failure of the power tool 10 based on the operating characteristics of the power tool 10.

FIG. 10B provides a graph 1040 with an alternative first operating characteristic 1045. In the example of FIG. 10B, the first operating characteristic 1045 is an average slope of the pressure between 1-3 kPSI, while the second operating characteristic 1050 remains the touch off percent. Graph 1040 includes a first region 1060 and a second region 1065. The first region 1060 is defined by a measurement of touch off percent less than approximately 0.048. The second region 1065 is defined by a measurement of touch off percent greater than approximately 0.048. Similar to the example described with respect to FIG. 10A, the controller 400 and/or the machine learning controller 630 may determine the crimping application of the power tool 10 by comparing the measured first operating characteristic and the measured second operating characteristic with values within the data in the graph 1040.

FIG. 10C provides a graph 1070 with an alternative first operating characteristic 1075. In the example of FIG. 10C, the first operating characteristic 1075 is a touch off time, while the second operating characteristic 1080 remains the touch off percent. Graph 1070 includes a first region 1090 and a second region 1095. The first region 1090 is defined by a measurement of touch off percent less than approximately 0.048. The second region 1095 is defined by a measurement of touch off percent greater than approximately 0.048. Similarly to the example described with respect to FIG. 10A, the controller 400 and/or the machine learning controller 630 may determine the crimping application of the power tool 10 by comparing the measured first operating characteristic and the measured second operating characteristic with values within the graph 1070.

Figure 11:
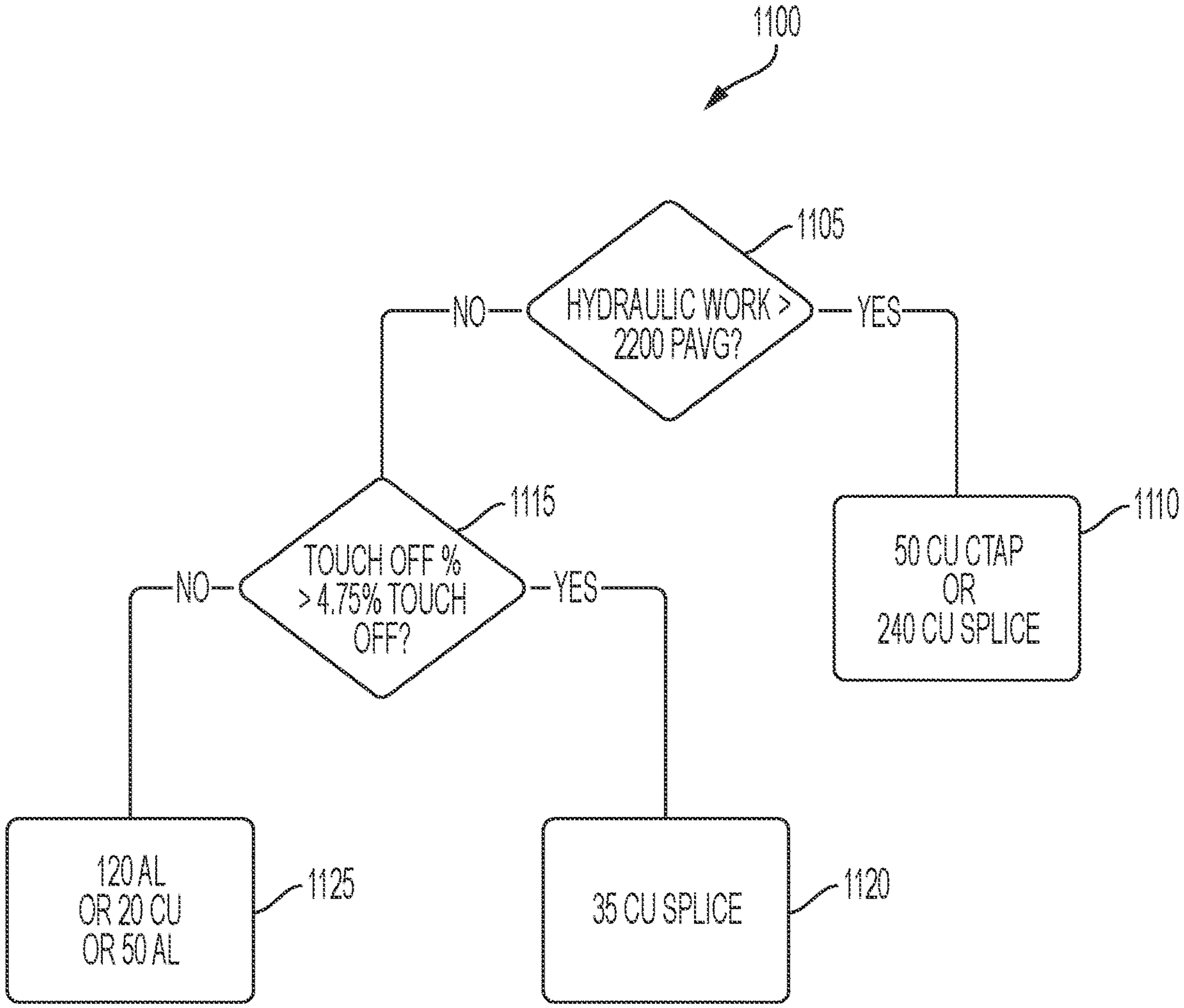
FIG. 11 illustrates a flow chart of a method performed by the controller of FIG. 4 in accordance with an embodiment described herein.

FIG. 11 provides a method 1100 performed by the controller 400 and/or the machine learning controller 630 for comparing the first operating characteristic and the second operating characteristic to the first region 1015, the second region 1020, and the third region 1025 of FIG. 10A. At step 1105, the controller 400 and/or the machine learning controller 630 determines whether the measured hydraulic work (e.g., the first operating characteristic, the time average pressure, etc.) is greater than 2200 $P_{avg}$ (average pressure). If the hydraulic work is greater than 2200 $P_{avg}$, the controller 400 and/or the machine learning controller 630 proceeds to step 1110. If the hydraulic work is less than 2200 $P_{avg}$, the controller 400 and/or the machine learning controller 630 proceeds to step 1115. At step 1110, the controller 400 and/or the machine learning controller 630 determines the application is within the first region 1015 and is either a 50 MCM Cu Ctap or a 240 MCM Cu splice.

At step 1115, the controller 400 and/or the machine learning controller 630 determines whether the measured touch off percent (e.g., the second operating characteristic, the contact distance, etc.) is greater than 4.75% touch off. If the measured touch off percent is greater than 4.75% touch off, the controller 400 and/or the machine learning controller 630 proceeds to step 1120. If the measured touch off percent is less than 4.75% touch off, the controller 400 and/or the machine learning controller 630 proceeds to step 1125. At step 1120, the controller 400 and/or the machine learning controller 630 determines the application is within the third region 1025, and that the application is a 35 MCM Cu splice. At step 1125, the controller 400 and/or the machine learning controller 630 determines the application is within the second region 1020, and is either a 120 MCM Al crimp, a 50 MCM Al crimp, or a 120 MCM Cu splice.

While FIG. 11 provides a single "tree" of a method, in some embodiments, the crimping application is determined by a forest of such trees. For example, the controller 400 and/or the machine learning controller 630 may utilize a plurality of tree methods similar to that provided in FIG. 11, each tree determining the crimping application based on different operational characteristics. Accordingly, each tree has a unique output indicating the crimping application determined by that tree. The controller 400 and/or the machine learning controller 630 may then determine the crimping application based on which output has a majority among all of the tree methods (e.g., occurs most frequently).

The controller 400 and/or the machine learning controller 630 may determine the crimping application while the operation is being performed ore before the operation is started (rather than after the operation is performed). For example, the power tool 10 may have defined modes for the workpiece being operated on. The power tool 10 may accordingly have a predetermined pressure or displacement for each mode and/or selected die. When the crimping application is determined while the crimping operation is performed, the controller 400 and/or the machine learning controller 630 may alter the ending pressure or displacement for the remaining duration of the crimping operation. The crimping application may be determined during operation but after, for example, a predetermined period of time has passed since the beginning of the operation, an amount of pressure rise exceeds a pressure threshold, an amount of displacement exceeds a displacement threshold, or the like. When determining the crimping application during operation, the controller 400 and/or the machine learning controller 630 may detect that the determined crimping application does not align with the selected defined mode. In such a situation, the controller 400 and/or the machine learning controller 630 may provide an alert or notification using the indicators 445 (such as flashing a red or yellow light) or may perform a protective operation of the power tool (such as stopping or pausing the motor 12). The controller 400 and/or the machine learning controller 630 may require a user to verify the crimping application (e.g., override or confirm) prior to proceeding to finish the operation. For example, if the detecting touch-off distance or displacement does not align with the defined mode, the motor 12 may be controlled to pause or reverse to protect the workpiece. A user then verifies the crimpling application prior to restarting the motor 12. In some embodiments, the tool may receive a sound input for voice verification. For example, the controller 400 and/or the machine learning controller 630 may output, via a display or speaker, a confirmation request. A user of the power tool 10 then provides a verbal confirmation.

In some embodiments, the first operating characteristic, the second operating characteristic, and/or probabilities of certain crimping applications may be combined to determine the crimping application. For example, a user performs five crimping applications in succession. The controller 400 and/or the machine learning controller 630 determines that four of the five crimping applications are 120 Al crimps, but 1 of the crimping applications is determined to be a 35 Cu splice. The controller 400 and/or the machine learning controller 630 may average (or otherwise apply a weight function to) the determined crimping applications to determine that all five crimping applications were 120 Al crimps. Additionally, the controller 400 and/or the machine learning controller 630 may account for the timing, the succession, the location, and the like when determining the crimping application(s). Historical information of the power tool 10 may also be used when determining the crimping application, such as which battery pack 480 is used, the user of the power tool 10, a geographical location of the power tool 10, and the like. In some embodiments, a user may preselect the crimping application performed by the power tool 10 (via, for example, the external device 605 or an input device of the power tool 10). The controller 400 and/or the machine learning controller 630 accounts for the preselected crimping application when determining subsequent operations. The preselection may include allowed crimping applications to limit the range of the power tool 10. Should the determined crimping application fall outside the range of what is allowed or typical of the power tool 10, the controller 400 and/or the machine learning controller 630 may output a warning via the indicators 445 or include a warning on the report 1200 (described in more detail below).

Figure 13:
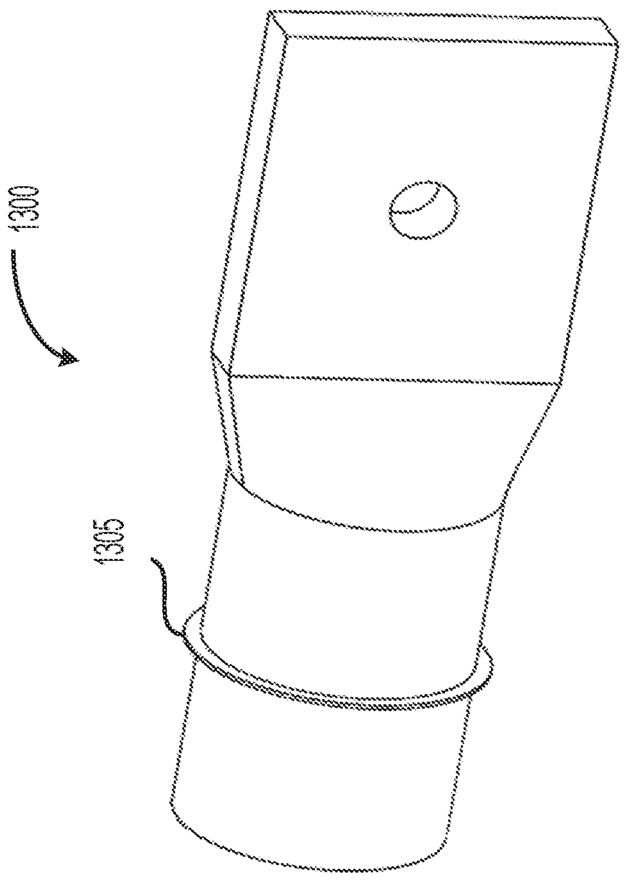
FIG. 13 illustrates an example crimp in accordance with an embodiment described herein.

In some embodiments, the crimp has a distinguishing feature that the controller 400 and/or the machine learning controller 630 accounts for when determining the crimping application. For example, in FIG. 13, a crimp 1300 includes a protrusion 1305. The illustrated protrusion 1305 is a crush rib, or a narrow revolute ring. However, the protrusion 1305 may instead be of a different shape, such as spike, a knurl, a knurl-like region, a partial ring, a second sleeve (e.g., of another material), a bubble or compressible pocket, multiple sets of rings, multiple lines of protrusions, a wavy ring, and the like. The different protrusions 1305 may align with different brands or manufacturers of the crimp 1300, a type or size of the crimp 1300, an operating target for the crimp 1300, and the like.

Figure 12:
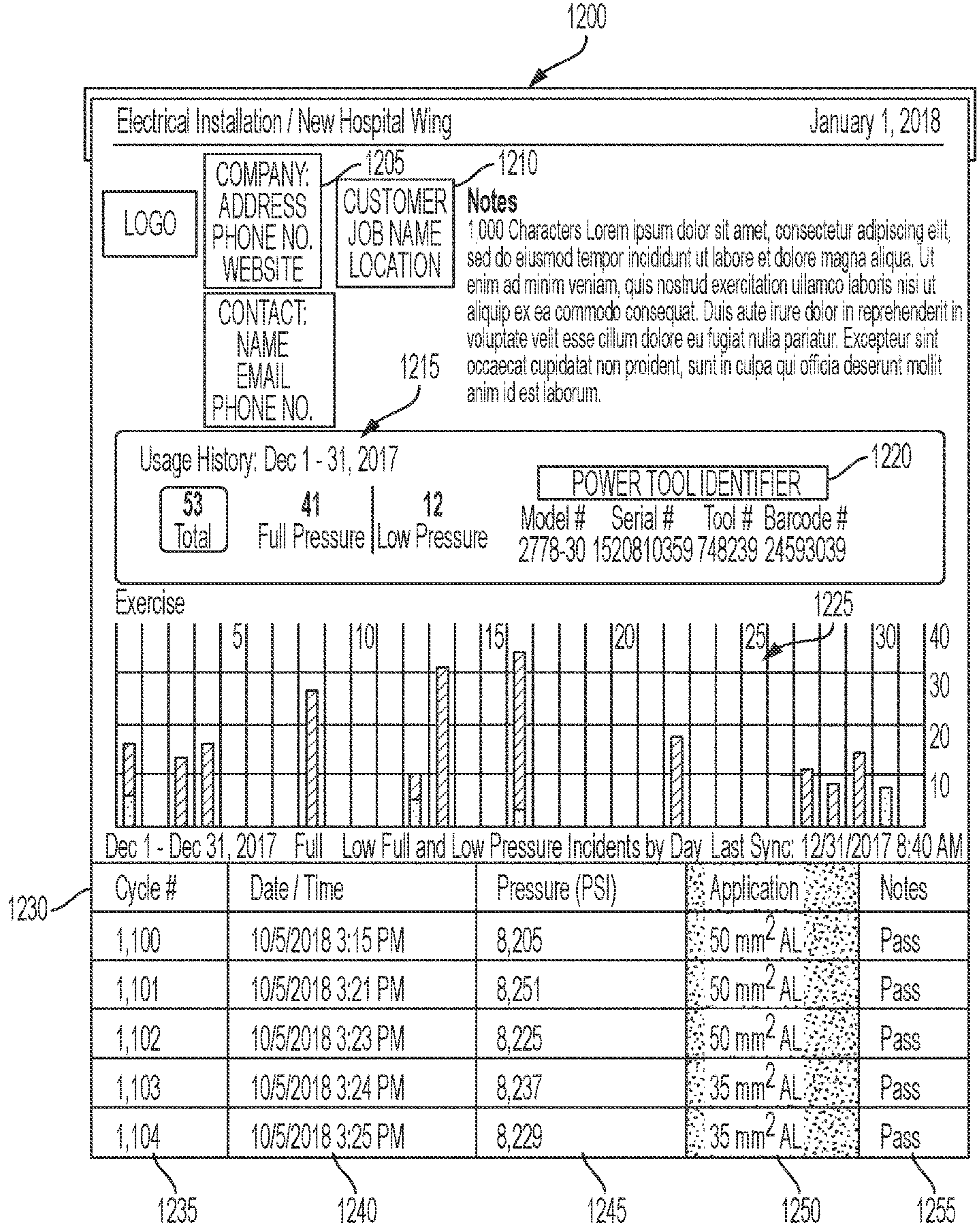
FIG. 12 illustrates an example report generated by a controller in accordance with embodiments described herein.

Returning to FIG. 9, at step 925, the controller 400 and/or the machine learning controller 630 generates a report for the crimping application. For example, FIG. 12 provides a report 1200. The report 1200 includes, among other things, a service provider 1205, a location 1210, a usage history 1215, a tool identifier 1220, and a usage graph 1225. The service provider 1205 provides an indication of the company and the worker that performed the crimping application. For example, the company name, address, phone number, fax number, and website may be provided. The worker's name, email, and phone number may be provided, among other contact information. The location 1210 provides an indication as to where the crimping application was performed, such as the customer name, a job name (or other job identifier), a specific location the crimping application was performed, a location based on GPS signals associated with the power tool 10 or external device 605, and the like.

The usage history 1215 may provide an overall usage of the power tool 10 over a predetermined period of time. In the example illustrated in FIG. 12, the usage history 1215 provides a history of the power tool 10 from Dec. 1 to Dec. 31, 2017. However, other time ranges may also be provided. The usage history 1215 may include the tool identifier 1220, which may include a model number, a serial number, a barcode, a tool number, or some other alphanumeric identifier used to identifier the power tool 10. Additionally, a usage graph 1225 may provide a graph illustrating usage of the power tool 10 over the predetermined period of time. In some embodiments, the report 1200 includes some or all statistics used in determining the crimping application. Additionally, the report 1200 may include raw or encoded runtime sensor data used in determining the crimping application.

The report 1200 may also include a table 1230 providing further usage history of the power tool 10. The table 1230 may include, among other things, a cycle number column 1235, a date and time column 1240, a pressure value column 1245, an application column 1250, and additional notes column 1255. The table 1230 may also include more or fewer columns. The cycle column 1235 provides a cycle number that may be used to identify a number of uses of the power tool 10 or identify a specific operation cycle of the power tool 10. The date and time column 1240 provides the date and time at which the corresponding cycle number was performed. The pressure value column 1245 may provide a maximum pressure value reached during the corresponding cycle number, an average pressure value reached during the corresponding cycle number, or the like. The application column 1250 provides the crimping application performed during the corresponding cycle number, and may be the crimping application determined in step 920 of the method 900. The additional notes column 1255 may include additional information regarding the corresponding cycle number, such as whether or not the performed application was a success. The table 1230 is not limited to these columns, and may include, among other things, the temperature of the power tool 10 (e.g., the motor temperature, the battery pack temperature, etc.) for a corresponding cycle number, the hydraulic work performed by the power tool 10 for a corresponding cycle number, an average battery voltage of the battery pack 480 for a corresponding cycle number, an average battery impedance of the battery pack 480 for a corresponding cycle number, and the like.

In some embodiments, the report 1200 may prompt a user to verify or fill in a performed crimping application. Additionally, a user may override, confirm, or classify crimping applications in the report 1200. For example, should every crimping application on the report 1200 is a first type except for one (which is a second type). A user or viewer of the report 1200 may be prompted to label each crimping application as the first type, overriding the determination of the second type. In some embodiments, the prompt is provided via the external device 605. Additionally, the report 1200 may rank, prioritize, and/or filter crimping applications that have similar operating characteristics.

In some embodiments, the power tool 10 includes a display, such as, for example, a liquid-crystal display (LCD), a light-emitting diode (LED) screen, an organic LED (OLED) screen, a digit display, and the like. The display may be integrated into the housing of the power tool 10, may be detachable from the power tool 10, or completely separate (e.g., unattachable) from the power tool 10. The display may directly provide the report 1200 on the power tool 10.

The report 1200 provides a way to confirm that the correct crimping applications were performed at a given location. For example, should 60 500 MCM Cu crimps need to be performed at a first location, and 40 600 MCM Al crimps need to be performed at an adjacent location, the report 1200 can confirm the correct crimping applications were performed at each location, reducing or eliminating any need for an inspector or other third party to check that wiring was correctly performed.

In some embodiments, the controller 400 and/or the machine learning controller 630 adjusts operation of the power tool 10 based on the determined crimping application. For example, the controller 400 and/or the machine learning controller 630 may determine the crimping application while operation of the motor 12 is still occurring. The controller 400 and/or the machine learning controller 630 may change a target pressure (for example, from 12,000 psi to 6,000 psi) during operation of the motor 12. Other aspects of operation of the power tool 10 may also be adjusted, such as the stroke, displacement, and the like. When a cutting operation is performed (see below), the controller 400 and/or the machine learning controller 630 may detect the end of the cut based on the determined cutting application. Accordingly, the motor 12 can then be controlled to stop without smashing hardstops of the power tool 10, minimizing the tool wear on internal components.

In some embodiments, the power tool 10 changes gearing based on the determined crimping application (either while the operation is performed or after operation is complete in preparation for a subsequent operation). The controller 400 and/or the machine learning controller 630 may use the determined crimping application to identify whether the battery pack 480 has enough stored energy to complete the crimping application. In some embodiments, the controller 400 and/or the machine learning controller 630 uses the determined crimping application to determine whether a second crimp is needed (e.g., determine a two-step crimping application).

In some embodiments, the controller 400 and/or the machine learning controller 630 maintains an inventory of a number of crimps in the memory 425. As crimping applications are determined, the controller 400 and/or the machine learning controller 630 monitors how many crimps are remaining. When the number of crimps decreases below a threshold, the controller 400 and/or the machine learning controller 630 automatically orders an additional number of crimps. Additionally, the controller 400 and/or the machine learning controller 630 may keep a counter of use or another estimation of wear of used dies. When the counter of use exceeds a usage threshold, the controller 400 and/or the machine learning controller 630 orders additional dies.

While the disclosure has primarily referred to a crimper embodiment, the power tool 10 may be capable of receiving other type of accessories beyond the crimper head 72 for crimping. For example, rather than crimping, the power tool 10 may be used for cutting, sheering, or punching. Accordingly, controller 400 and/or the machine learning controller 630 may determine a type of cutting, sheering, or punching application. In some embodiments, the controller 400 and/or the machine learning controller 630 may determine that no application was performed by the power tool 10. In this instance, the power tool 10 may be run in the air without applying a force to a workpiece.

The classification could be broad (distinguishing between crimpers vs. cuts), more specifically distinguishing between large or small crimps, or specifically distinguishing which crimp). The classification could focus on which crimp was used or a characteristic of the crimp (e.g., wire type/material/stranded vs. concentric, vs. solid, manufacturer of crimp, etc.). The classifications could also include an unknown, other, or not-sure category.

Furthermore, while the method 900 of FIG. 9 is described with respect to a crimper, in some embodiments, the method 900 is implemented by other examples of the power tool 10, such as circular saws, jigsaws, bandsaws, drills-drivers, impact drivers, hammer drills-drivers, and the like. In other words, the operational data of other tool types may be processed by the machine learning controller 630 to generate outputs for and control operation of these other power tool types. In Table 5, below, a list of example power tools that implement the method 900 and associated examples of output indications (e.g., tool application types, tool application statuses, and tool statuses) that are provided by the output (in step 920) through implementing the method 900 are provided.

TABLE 5

| Power Tool Type | Output Indication |
|---|---|
| Drill, ratchet, screw gun | Detection of bit change, a no load condition, hitting a nail or a second material in a first material, drilling breakthrough, workpiece material(s), drilling accessory, steps in a step bit, binding (and hints of future binding), workpiece fracture or splitting, lost accessory engagement, user grip and/or side handle use, fastening application, fastening materials, fasteners, workpiece fracture or splitting, fastener seating, lost fastener engagement and stripping, user grip and/or side handle use |
| Impact driver | Detection of socket characteristics such as deep vs short, of hard vs. soft joints, of tight vs loose fasteners, of worn vs new anvils and sockets, of characteristic impact timing |
| Drain cleaner | Detection of encountering clogs, of windup, of directional changes, of approximate length of cord, of cord breakage, end effector type |
| Circular saw, reciprocating saw, jig saw, chainsaw, table saw, miter saw | Detection of turning, blade binding, blade breakage, blade type, material(s) type, blade wear, type of blade, condition of blade (wear, heat), detection of blade orbit/motion/stroke/tpi/ speed/etc., blade tension (chain saw) |
| Vacuum | Detection of clogs, identification of placement on hard surface or up in the air (characterized in part by adjacent surface contact vibrations) |
| Knockout tool | Detection of improper alignment, breakthrough, die wear |
| Cut tool | Detection of fracturing of brittle material, e.g., polyvinyl chloride (PVC) |
| String trimmer | Detection of hardness, density, and potential location of contacted bodies |
| Hedge trimmer | Detection of type of cutting application, hitting wire and/or metal, cutting surface wear/breakage |
| Various power tools: | Detection of failure modes, including bearing failures, gearbox failures, and power switch failures (e.g., fetting) |
| Transfer pump | Detection of clogs, liquid characteristics |
| Crimpers | Detection of uncentered applications, slippage, improper die and crimp combinations |
| Sanders | Detection of state of sanding material, likely material, if on flat surface or suspended |
| Multitool | Detection of application, blade, blade wear, contact vs. no contact |
| Grinder/cutoff wheel | Detection of application, abrasive wheel, wheel wear, wheel chip, wheel fracture, etc. |

TABLE 5-continued

| Power Tool Type | Output Indication |
| --- | --- |
| Bandsaw | Detection of application, cut finish, blade health, blade type |
| Rotary hammer | Detection of contact with rebar, high debris situations, or build-up |
| Rotary tool | Detection of application, accessory, accessory wear |
| Inflator | Detection of tire burst or leak (e.g., in valve) |

As discussed above with respect to FIGS. 1-13, the machine learning controller 630 has various applications and can provide the power tool 10 with an ability to analyze various types of sensor data and received feedback. Generally, the machine learning controller 630 may provide various levels of information and usability to the user of the power tool 10. For example, in some embodiments, the machine learning controller 630 analyzes usage data from the power tool 10 and provides analytics that help the user make more educated decisions. Table 6 below lists a plurality of different implementations or applications of the machine learning controller 630. For each application, Table 6 lists potential inputs to the machine learning controller 630 that would provide sufficient insight for the machine learning controller 630 to provide the listed potential output(s). The inputs are provided by various sources, such as the sensors 450, as described above.

TABLE 6

| Machine Learning Application | Potential Inputs to Machine Learning Controller | Potential Output(s) from Machine Learning Controller |
| --- | --- | --- |
| Anti-kickback control | Motion sensor(s) and/or running data (i.e., motor current, voltage, speed, trigger, gearing, etc.); Optionally mode knowledge, sensitivity settings, detection of side handle, recent kickback, state of tethering, orientation, battery added rotational inertia | Kickback event indication (used as control signal to electronic processor 550 to stop motor), identification of user beginning to let up on trigger and responding faster |
| Fastener seated | Motion sensor(s) and/or running data; Optionally mode knowledge, past use | Fastener seated or near seated indication (used to stop or slow motor, begin state such as pulsing, increase kickback sensitivity temporarily, etc.) |
| Screw strip | Running data and/or motion (movement and/or position); Optionally settings (such as clutch settings), past screw stripping detection/accessory wear, mode knowledge | Screw stripping indication (used as control signal to electronic processor 550, which responds by, e.g., clutching out, backing motor off, updating settings, and/or pulsing motor) |
| Tool application identification (drills, impacts, saws, and others); Similarly: identification of material type, characteristic (e.g., thickness), or condition identification of accessory type or condition identification of power tool event (e.g., stripping, losing engagement with a fastener, binding, breakthrough) identification of power tool context (e.g., likely on a ladder based on tool acceleration) identification of rating of power tool performance | Running data (motor current, voltage, speed, trigger, gearing etc.), recent tool use (accessory change detections), timing, tool settings; Optionally past tool use, knowledge of likely applications (such as trade, common materials, etc.), sound (for material identifications), vibration patterns, nearby tools and/or their recent use, learning rate input or on/off switch, battery presence and properties, user gear selection, direction input, clutch settings, presence of tool attachments (like side handle), nearby tool use, location data | The output is one or more of tweaking of settings, switching modes or profiles (for example, as combinations of profiles), alerting a user to a condition, auto-gear selection, change or activation of output (e.g., reduce saw output if hit nail, turn on orbital motion if softer material, turn off after break through, etc.), use/accessory analytics (including suggestion/auto purchase of accessories, selling of such data to commercial partners, providing analytics of work accomplished); tool bit, blade, or socket identification and condition; workpiece fracturing; detection of hardness, density, and location of contacted objects; detection of uncentered applications, slippage, improper die and crimp combinations; condition and identification of sanding material; suspended or level sanding |

TABLE 6-continued

| Machine Learning Application | Potential Inputs to Machine Learning Controller | Potential Output(s) from Machine Learning Controller |
|---|---|---|
| | | position; tire burst or leak condition; detection of vacuum clogs, suction surface, and orientation; detection of pumping fluid characteristics; and identification of application, material type, material characteristic material condition, accessory type, accessory condition, power tool event, power tool context, and/or rating of power tool performance |
| Light duration/state | Running data, motion data (e.g., when placed on ground/ hung on tool belt), nearby tools (e.g., lights), retriggers when light is going out | Optimize tool light duration during or after use; possible recognizing and responding to being picked up |
| Estimate of user condition (e.g., skill, aggressiveness, risk, fatigue) | Running data, detection of kickback, screw stripping, aggressiveness, timing (such as pacing, breaks, or hurriedness) | Safety risk level on jobsite or by user, usable in prevention or motivating insurance rates, or alert to user of detected condition as warning (e.g., fatigue warning) |
| Ideal charging rates | Past tool/battery use, time of day, stage of construction, battery charge states, presence of batteries | A charger may reduce speed of charging if the charger does not think a rapid charge will be necessary for a user (may extend overall battery life) |
| Ideal output (e.g., for a string trimmer) Note: similar for sanders/grinders/many saws, hammering devices, energy needed for nailers, grease gun/soldering iron/ glue gun output | Running and motion data, timing | Detection of contact (resistance) helps to determine height of user as well as typical angle/motion for expecting contact. Running model of string length can help to optimize speed for consistent performance |
| Identification of user | Running data, motion, and/or location data, data from other tools, timing | Useful for tool security features and more quickly setting preferences - especially in a shared tools environment |
| Tool health and maintenance | Running data, motion, location, weather data, higher level identification such as applications, drops, temperature sensors | Identification or prediction of wear, damage, etc., use profile in coordination with customized warrantee rates |
| Precision Impact | Running data, motion, application knowledge (including input of fastener types), timing of use, settings, feedback from digital torque wrench, desired torque or application input | Identification of star pattern for lug nuts, estimate for auto-stop to improve consistency, warning to user for over/under/unknown output |
| Characteristic positive or negative feedback | Tool motion, restarts, or changes in input, trigger depression, tool shaking, feedback buttons | This can feed many other machine learning control blocks and logic flows as well as provide useful analytics on user satisfaction |

When determining the application of the power tool 10 (at step 920), the controller 400 and/or the machine learning controller 630 may distinguish between actions (for example, a crimping action versus a cutting action). In some embodiments, rather than determining the specific application performed by the power tool 10, the controller 400 and/or the machine learning controller 630 may more broadly characterize the application, such as distinguishing between a "large" crimp and a "small" crimp. Additionally, the controller 400 and/or the machine learning controller 630 may determine a characteristic of the crimp itself, such as a type of wire crimped, a shape of the crimp, a manufacturer of the crimp, and the like. The determination of the application may also include a certainty (e.g., a confidence level) of the controller 400 and/or the machine learning controller 630. Each of these may be included in the report 1200.

Thus, embodiments provided herein describe, among other things, systems and methods for determining and reporting an application performed by a power tool.

What is claimed is:

1. A power tool comprising:

a pair of jaws configured to crimp a workpiece;

a piston cylinder configured to actuate at least one of the pair of jaws;

one or more sensors configured to provide characteristic signals associated with a crimping application; and an electronic processor connected to the one or more sensors, the electronic processor configured to:

receive, from the one or more sensors, one or more characteristic signals, determine, based on the one or more characteristic signals, a first operating characteristic of the power tool, determine, based on the one or more characteristic signals, a second operating characteristic of the power tool, compare the first operating characteristic and the second operating characteristic to a plurality of application profiles, determine the crimping application of the power tool based on the comparison, wherein, to determine the crimping application, the electronic processor is configured to determine a crimping application type including a material type of the workpiece that is crimped and a crimp size, and generate a report indicating the crimping application type performed by the power tool.

2. The power tool of claim 1, wherein both the first operating characteristic and the second operating characteristic are selected from the group consisting of hydraulic work, contact distance, a maximum time derivative of pressure, an average time derivative of pressure, a minimum time derivative of pressure, a negative time derivative of pressure, a touch off time, a total operating time, an average time derivative of pressure, and an average second time derivative of pressure.

3. The power tool of claim 2, wherein the first operating characteristic is hydraulic work, and the second operating characteristic is contact distance.

4. The power tool of claim 1, wherein the electronic processor is configured to implement a random forest machine learning algorithm to determine the crimping application of the power tool.

5. The power tool of claim 1, wherein the report includes the crimping application of the power tool, a time the crimping application was performed, and a location the crimping application was performed.

6. The power tool of claim 1, wherein the power tool further includes a motor configured to actuate the piston cylinder, wherein the one or more sensors includes a voltage sensor configured to sense a voltage of the motor, wherein the one or more sensors includes a current sensor configured to sense a current of the motor, and wherein the electronic processor is further configured to:

receive, from the voltage sensor, one or more voltage signals, receive, from the current sensor, one or more current signals, determine, based on the one or more voltage signals and the one or more current signals, the first operating characteristic of the power tool, and determine, based on the one or more voltage signals and the one or more current signals, the second operating characteristic of the power tool.

7. The power tool of claim 1, wherein the one or more sensors include a pressure sensor configured to sense a pressure of the piston cylinder, and wherein the electronic processor is further configured to:

receive, from the pressure sensor, one or more pressure signals, determine, based on the one or more pressure signals, the first operating characteristic of the power tool, and determine, based on the one or more pressure signals, the second operating characteristic of the power tool.

8. The power tool of claim 1, wherein the plurality of application profiles comprises one or more pressure profiles, voltage profiles, or current profiles.

9. A method for reporting usage of a power tool, the method comprising:

receiving, from one or more sensors, one or more characteristic signals, the one or more characteristic signals being associated with a crimping application by the power tool, where the power tool comprises a pair of jaws configured to crimp a workpiece and a piston cylinder configured to actuate at least one of the pair of jaws, determining, based on the one or more characteristic signals, a first operating characteristic of the power tool, determining, based on the one or more characteristic signals, a second operating characteristic of the power tool, comparing the first operating characteristic and the second operating characteristic to a plurality of application profiles, determining the crimping application of the power tool based on the comparison, wherein determining the crimping application includes determining a crimping application type including a material type of the workpiece that is crimped and a crimp size, and generating a report indicating the crimping application type performed by the power tool.

10. The method of claim 9, wherein both the first operating characteristic and the second operating characteristic are selected from the group consisting of hydraulic work, contact distance, a maximum time derivative of pressure, an average time derivative of pressure, a minimum time derivative of pressure, a negative time derivative of pressure, a touch off time, a total operating time, an average time derivative of pressure, and an average second time derivative of pressure.

11. The method of claim 9, wherein the first operating characteristic is hydraulic work, and the second operating characteristic is contact distance.

12. The method of claim 9, further comprising using a random forest machine learning algorithm to determine the crimping application of the power tool.

13. The method of claim 9, wherein the report includes the crimping application of the power tool, a time the crimping application was performed, and a location the crimping application was performed.

14. The method of claim 9, wherein the one or more sensors includes a voltage sensor configured to sense a voltage of a motor of the power tool, wherein the one or more sensors includes a current sensor configured to sense a current of the motor, and wherein the method further includes:

receiving, from the voltage sensor, one or more voltage signals, receiving, from the current sensor, one or more current signals, determining, based on the one or more voltage signals and the one or more current signals, the first operating characteristic of the power tool, and determining, based on the one or more voltage signals and the one or more current signals, the second operating characteristic of the power tool.

15. The method of claim 9, wherein the one or more sensors includes a pressure sensor configured to sense a pressure of the piston cylinder of the power tool, and wherein the method further includes:

receiving, from the pressure sensor, one or more pressure signals, determining, based on the one or more pressure signals, the first operating characteristic of the power tool, and determining, based on the one or more pressure signals, the second operating characteristic of the power tool.

16. A power tool comprising:

a piston cylinder configured to actuate a pair of jaws during a crimping application;

one or more sensors configured to sense power tool characteristics associated with the crimping application; and an electronic processor connected to the one or more sensors, the electronic processor configured to:

receive, from the one or more sensors, one or more characteristic signals, determine, based on the one or more characteristic signals, a plurality of operating characteristics, compare the plurality of operating characteristics to a plurality of application profiles, determine the crimping application of the power tool based on the comparison, wherein, to determine the crimping application, the electronic processor is configured to determine a crimping application type including a material type of a workpiece that is crimped and a crimp size, and generate a report indicating the crimping application type performed by the power tool.

17. The power tool of claim 16, wherein the report includes the crimping application of the power tool, a time the crimping application was performed, and a location the crimping application was performed.

18. The power tool of claim 16, wherein the power tool further includes a motor configured to actuate the piston cylinder, wherein the one or more sensors includes a voltage sensor configured to sense a voltage of the motor, wherein the one or more sensors includes a current sensor configured to sense a current of the motor, and wherein the electronic processor is further configured to:

receive, from the voltage sensor, one or more voltage signals, receive, from the current sensor, one or more current signals, and determine, based on the one or more voltage signals and the one or more current signals, the plurality of operating characteristics.

19. The power tool of claim 16, wherein the one or more sensors includes a pressure sensor configured to sense a pressure of the piston cylinder, and wherein the electronic processor is further configured to:

receive, from the pressure sensor, one or more pressure signals, and determine, based on the one or more pressure signals, the plurality of operating characteristics.

20. The power tool of claim 16, wherein the electronic processor is configured to implement a random forest machine learning algorithm to determine the crimping application of the power tool.

21. The power tool of claim 20, wherein the random forest machine learning algorithm includes a plurality of algorithms, each algorithm configured to provide an output, and wherein the electronic processor is further configured to:

determine the crimping application by determining which output of the plurality of algorithms occurs the most frequently.

* * * * *